United States Patent
Richardson et al.

(10) Patent No.: US 10,022,825 B2
(45) Date of Patent: *Jul. 17, 2018

(54) METHOD FOR RESTORING, REPAIRING, REINFORCING, PROTECTING, INSULATING AND/OR CLADDING A VARIETY OF STRUCTURES

(71) Applicant: CFS Concrete Forming Systems Inc., Vancouver (CA)

(72) Inventors: George David Richardson, Vancouver (CA); Semion Krivulin, Richmond (CA); Zi Li Fang, New Westminster (CA)

(73) Assignee: CFS Concrete Forming Systems Inc., Vancouver (CA)

( * ) Notice: Subject to any disclaimer, the term of this patent is extended or adjusted under 35 U.S.C. 154(b) by 202 days.

This patent is subject to a terminal disclaimer.

(21) Appl. No.: 13/734,369

(22) Filed: Jan. 4, 2013

(65) Prior Publication Data

US 2014/0013563 A1    Jan. 16, 2014

Related U.S. Application Data

(63) Continuation of application No. PCT/CA2011/050414, filed on Jul. 6, 2011.

(Continued)

(51) Int. Cl.
*B23P 6/00* (2006.01)
*E04F 13/08* (2006.01)
(Continued)

(52) U.S. Cl.
CPC ............ *B23P 6/00* (2013.01); *E04F 13/0803* (2013.01); *E04F 13/0898* (2013.01);
(Continued)

(58) Field of Classification Search
CPC . E04G 23/02; E04G 23/0203; E04G 23/0218; E04G 23/0229; E04G 23/0266;
(Continued)

(56) References Cited

U.S. PATENT DOCUMENTS

| 154,179 A | 8/1874 | Hubert |
|---|---|---|
| 374,826 A | 12/1887 | Clarke |

(Continued)

FOREIGN PATENT DOCUMENTS

| CA | 0574720 | 4/1959 |
|---|---|---|
| CA | 0957816 | 11/1974 |

(Continued)

OTHER PUBLICATIONS

Vector Corrosion Technologies Marketing Materials, 2005.
(Continued)

*Primary Examiner* — Sarang Afzali
(74) *Attorney, Agent, or Firm* — Oyen Wiggs Green & Mutala LLP

(57) ABSTRACT

Methods and apparatus are provided for repairing existing structures. A portion of the existing structure is covered with the repair structure. One or more standoffs are coupled to the existing structure to project outwardly away from a surface of the existing structure. One or more cladding panels are coupled to the standoffs by forcing the one or more panels in a direction normal to the surface of the existing structure and into engagement with a standoff connector component of the standoff at a location spaced apart from the existing structure. Curable construction material and/or insulation may be introduced into the space between the cladding panels and the existing structure to provide a repair structure.

28 Claims, 22 Drawing Sheets

Related U.S. Application Data

(60) Provisional application No. 61/361,833, filed on Jul. 6, 2010.

(51) Int. Cl.
*E04F 19/06* (2006.01)
*E04G 23/02* (2006.01)

(52) U.S. Cl.
CPC ........ *E04F 19/062* (2013.01); *E04G 23/0296* (2013.01); *Y10T 29/49732* (2015.01); *Y10T 29/53* (2015.01)

(58) Field of Classification Search
CPC . E04G 23/0288; E04G 23/0296; E04G 11/06; E04G 17/14; E02D 5/64; E04B 1/02; E04B 1/04; E04B 1/16; E04B 1/62; E04B 2/64; E04B 2/68; E04B 2/84; E04B 2/86; E04B 2/8611; E04B 2/8623; E04B 2/8635; E04B 2/8652; E04F 13/098; E04F 13/0803; E04F 13/0805; E04F 19/06; E04F 19/062; E04F 19/065; E04F 19/066; Y10T 29/49732; Y10T 29/49739; Y10T 29/49746; B23P 6/00
See application file for complete search history.

(56) References Cited

U.S. PATENT DOCUMENTS

| | | |
|---|---|---|
| 510,720 A | 12/1893 | Stewart, Jr. |
| 820,246 A | 5/1906 | Nidds |
| 3,545,152 A | 12/1907 | Knohl |
| 999,334 A | 8/1911 | Pearson |
| 1,035,206 A | 8/1912 | Lewen |
| 1,080,221 A | 12/1913 | Jester |
| 1,175,168 A | 3/1916 | Moulton |
| 1,244,608 A | 10/1917 | Hicks |
| 1,276,147 A | 8/1918 | White |
| 1,345,156 A | 6/1920 | Flynn |
| 1,423,879 A | 7/1922 | Potter |
| 1,540,570 A | 6/1925 | Roberts |
| 1,637,410 A | 8/1927 | Corybell |
| 1,653,197 A | 12/1927 | Barnes |
| 1,715,466 A | 6/1929 | Miller |
| 1,820,897 A | 8/1931 | White et al. |
| 1,875,242 A | 8/1932 | Hathaway |
| 1,915,611 A | 6/1933 | Miller |
| 1,963,153 A | 6/1934 | Schmieder |
| 2,008,162 A | 7/1935 | Waddell |
| 2,050,258 A | 8/1936 | Bemis |
| 2,059,483 A * | 11/1936 | Parsons ...................... 52/506.06 |
| 2,076,472 A | 4/1937 | London |
| 2,164,681 A | 7/1939 | Fould |
| 2,172,052 A | 9/1939 | Robbins |
| 2,314,448 A | 3/1943 | Hoggatt |
| 2,326,361 A | 8/1943 | Jacobsen |
| 2,354,485 A | 7/1944 | Slaughter |
| 2,845,685 A | 8/1958 | Lovgren et al. |
| 2,861,277 A * | 11/1958 | Hermann .................. E04H 4/00 160/233 |
| 2,871,619 A | 2/1959 | Walters |
| 2,892,340 A | 6/1959 | Fort |
| 2,928,115 A | 3/1960 | Hill |
| 3,063,122 A | 11/1962 | Katz |
| 3,100,677 A | 8/1963 | Frank et al. |
| 3,152,354 A | 10/1964 | Diack |
| 3,184,013 A | 5/1965 | Pavlecka |
| 3,196,990 A | 7/1965 | Handley |
| 3,199,258 A * | 8/1965 | Jentoft et al. .................. 52/222 |
| 3,220,151 A | 11/1965 | Goldman |
| 3,242,834 A | 3/1966 | Sondheim |
| 3,288,427 A | 11/1966 | Pluckebaum |
| 3,291,437 A | 12/1966 | Bowden et al. |
| 3,321,884 A | 5/1967 | Klaue |
| 3,468,088 A | 9/1969 | Miller |
| 3,555,751 A | 1/1971 | Thorgusen |
| 3,588,027 A | 6/1971 | Bowden |
| 3,682,434 A | 8/1972 | Boenig |
| 3,769,769 A | 11/1973 | Kohl |
| 3,788,020 A | 1/1974 | Gregori |
| 3,822,557 A | 7/1974 | Frederick |
| 3,886,705 A | 6/1975 | Cornland |
| 3,951,294 A | 4/1976 | Wilson |
| 3,959,940 A | 6/1976 | Ramberg |
| 3,991,636 A | 11/1976 | Devillers |
| 4,023,374 A | 5/1977 | Colbert et al. |
| 4,060,945 A | 12/1977 | Wilson |
| 4,104,837 A | 8/1978 | Naito |
| 4,106,233 A | 8/1978 | Horowitz |
| 4,114,388 A | 9/1978 | Straub |
| 4,180,956 A * | 1/1980 | Gross ........................ E04B 2/32 52/407.1 |
| 4,182,087 A | 1/1980 | Schall et al. |
| 4,193,243 A * | 3/1980 | Tiner .............................. 52/514 |
| 4,276,730 A | 7/1981 | Lewis |
| 4,299,070 A | 10/1981 | Oltmanns et al. |
| 4,332,119 A | 6/1982 | Toews |
| 4,351,870 A | 9/1982 | English |
| 4,383,674 A | 5/1983 | Fricker |
| 4,430,831 A | 2/1984 | Kemp |
| 4,433,522 A | 2/1984 | Yerushalmi |
| 4,434,597 A | 3/1984 | Fischer |
| 4,508,310 A | 4/1985 | Schultz |
| 4,532,745 A | 8/1985 | Kinard |
| 4,543,764 A | 10/1985 | Kozikowski |
| 4,550,539 A | 11/1985 | Foster |
| 4,553,875 A | 11/1985 | Casey |
| 4,575,985 A | 3/1986 | Eckenrodt |
| 4,581,864 A | 4/1986 | Shvakhman et al. |
| 4,606,167 A | 8/1986 | Thorne |
| 4,664,560 A | 5/1987 | Cortlever |
| 4,695,033 A | 9/1987 | Imaeda et al. |
| 4,703,602 A | 11/1987 | Pardo |
| 4,731,964 A | 3/1988 | Phillips |
| 4,731,971 A | 5/1988 | Terkl |
| 4,742,665 A | 5/1988 | Baierl |
| 4,808,039 A | 2/1989 | Fischer |
| 4,856,754 A | 8/1989 | Yokota et al. |
| 4,866,891 A | 9/1989 | Young |
| 4,930,282 A * | 6/1990 | Meadows ................. E04D 1/20 52/551 |
| 4,946,056 A | 8/1990 | Stannard |
| 4,995,191 A | 2/1991 | Davis |
| 5,014,480 A | 5/1991 | Guarriello et al. |
| 5,018,982 A * | 5/1991 | Speraw .................. H05K 7/142 174/138 D |
| 5,028,368 A | 7/1991 | Grau |
| 5,058,855 A | 10/1991 | Ward |
| 5,078,360 A | 1/1992 | Spera |
| 5,106,233 A | 4/1992 | Breaux |
| 5,124,102 A | 6/1992 | Serafini |
| 5,187,843 A | 2/1993 | Lynch |
| 5,216,863 A | 6/1993 | Nessa et al. |
| 5,243,805 A | 9/1993 | Fricker |
| 5,247,773 A | 9/1993 | Weir |
| 5,265,750 A | 11/1993 | Whiteley |
| 5,292,208 A | 3/1994 | Berger |
| 5,311,718 A | 5/1994 | Trousilek |
| 5,465,545 A | 11/1995 | Trousilek |
| 5,489,468 A | 2/1996 | Davidson |
| 5,491,947 A | 2/1996 | Kim |
| 5,513,474 A | 5/1996 | Scharkowski |
| 5,516,863 A | 5/1996 | Abusleme et al. |
| 5,553,430 A | 9/1996 | Majnaric et al. |
| 5,591,265 A | 1/1997 | Tusch |
| 5,608,999 A | 3/1997 | McNamara |
| 5,625,989 A | 5/1997 | Brubaker et al. |
| 5,714,045 A | 2/1998 | Lasa et al. |
| 5,729,944 A | 3/1998 | De Zen |
| 5,740,648 A | 4/1998 | Piccone |
| 5,747,134 A | 5/1998 | Mohammed et al. |
| 5,791,103 A | 8/1998 | Coolman |
| 5,824,347 A | 10/1998 | Serafini |

(56) References Cited

U.S. PATENT DOCUMENTS

| | | | |
|---|---|---|---|
| 5,860,262 A * | 1/1999 | Johnson | E04B 1/14 |
| | | | 52/293.1 |
| 5,953,880 A | 9/1999 | De Zen | |
| 5,987,830 A | 11/1999 | Worley | |
| 6,053,666 A | 4/2000 | Irvine et al. | |
| 6,151,856 A | 11/2000 | Shimonohara | |
| 6,161,989 A | 12/2000 | Kotani et al. | |
| 6,167,669 B1 | 1/2001 | Lanc | |
| 6,167,672 B1 | 1/2001 | Okitomo | |
| 6,178,711 B1 | 1/2001 | Laird et al. | |
| 6,185,884 B1 | 2/2001 | Myers et al. | |
| 6,189,269 B1 | 2/2001 | De Zen | |
| 6,212,845 B1 | 4/2001 | De Zen | |
| 6,219,984 B1 | 4/2001 | Piccone | |
| 6,220,779 B1 | 4/2001 | Warner et al. | |
| 6,247,280 B1 * | 6/2001 | Grinshpun et al. | 52/309.12 |
| 6,286,281 B1 | 9/2001 | Johnson | |
| 6,293,067 B1 | 9/2001 | Meendering et al. | |
| 6,357,196 B1 | 3/2002 | McCombs | |
| 6,387,309 B1 | 5/2002 | Kojima | |
| 6,405,508 B1 * | 6/2002 | Janesky | 52/741.4 |
| 6,435,470 B1 | 8/2002 | Lahham et al. | |
| 6,435,471 B1 * | 8/2002 | Piccone | E04B 2/8641 |
| | | | 249/191 |
| 6,438,918 B2 * | 8/2002 | Moore et al. | 52/426 |
| 6,467,136 B1 | 10/2002 | Graham | |
| 6,530,185 B1 | 3/2003 | Scott et al. | |
| 6,550,194 B2 | 4/2003 | Jackson et al. | |
| 6,588,165 B1 * | 7/2003 | Wright | 52/506.05 |
| 6,622,452 B2 | 9/2003 | Alvaro | |
| 6,691,976 B2 | 2/2004 | Myers et al. | |
| 6,694,692 B2 * | 2/2004 | Piccone | E04B 1/12 |
| | | | 249/191 |
| 6,832,456 B1 | 12/2004 | Bilowol | |
| 6,866,445 B2 | 3/2005 | Semler | |
| 6,935,081 B2 | 8/2005 | Dunn et al. | |
| 7,320,201 B2 | 1/2008 | Kitchen et al. | |
| 7,444,788 B2 * | 11/2008 | Morin | E04B 2/8641 |
| | | | 52/425 |
| 7,818,936 B2 * | 10/2010 | Morin | E04B 2/8641 |
| | | | 52/421 |
| 8,074,418 B2 | 12/2011 | Thiagarajan et al. | |
| 8,485,493 B2 | 7/2013 | Wells et al. | |
| 8,707,648 B2 * | 4/2014 | Timko et al. | 52/511 |
| 8,769,904 B1 | 7/2014 | Brandt et al. | |
| 8,806,839 B2 | 8/2014 | Zhou | |
| 8,881,483 B2 | 11/2014 | Caboni | |
| 8,959,871 B2 | 2/2015 | Parenti et al. | |
| 9,315,987 B2 * | 4/2016 | Richardson | E04B 2/8641 |
| 9,359,780 B2 * | 6/2016 | Richardson | E04G 23/0203 |
| 2003/0005659 A1 | 1/2003 | Moore, Jr. | |
| 2003/0085482 A1 | 5/2003 | Sincock et al. | |
| 2003/0155683 A1 | 8/2003 | Pietrobon | |
| 2004/0010994 A1 | 1/2004 | Piccone | |
| 2004/0020149 A1 | 2/2004 | Messiqua | |
| 2004/0093817 A1 | 5/2004 | Pujol Barcons | |
| 2004/0216408 A1 | 11/2004 | Hohmann, Jr. | |
| 2005/0016083 A1 | 1/2005 | Morin et al. | |
| 2005/0016103 A1 | 1/2005 | Piccone | |
| 2006/0179762 A1 * | 8/2006 | Thome et al. | 52/506.01 |
| 2006/0185270 A1 | 8/2006 | Handley et al. | |
| 2006/0213140 A1 | 9/2006 | Morin et al. | |
| 2007/0028544 A1 | 2/2007 | Messiqua et al. | |
| 2007/0107341 A1 | 5/2007 | Zhu | |
| 2007/0193169 A1 | 8/2007 | Emblin | |
| 2008/0168734 A1 | 7/2008 | Degen et al. | |
| 2009/0120027 A1 * | 5/2009 | Amend | 52/426 |
| 2009/0229214 A1 | 8/2009 | Nelson | |
| 2009/0269130 A1 | 10/2009 | Williams | |
| 2010/0047608 A1 | 2/2010 | Seccombe | |
| 2010/0050552 A1 | 3/2010 | David | |
| 2010/0071304 A1 | 3/2010 | Richardson et al. | |
| 2010/0251657 A1 | 10/2010 | Richardson et al. | |
| 2011/0000161 A1 | 1/2011 | Aube | |
| 2011/0099932 A1 | 5/2011 | Saulce | |
| 2011/0131914 A1 | 6/2011 | Richardson et al. | |
| 2012/0056344 A1 | 3/2012 | Richardson et al. | |
| 2012/0121337 A1 | 5/2012 | Richardson et al. | |
| 2013/0081345 A1 | 4/2013 | Sheehy | |
| 2014/0013563 A1 * | 1/2014 | Richardson et al. | 29/402.09 |

FOREIGN PATENT DOCUMENTS

| | | |
|---|---|---|
| CA | 1316366 | 4/1993 |
| CA | 2097226 | 11/1994 |
| CA | 2141463 | 8/1996 |
| CA | 2070079 | 6/1997 |
| CA | 2170681 | 8/1997 |
| CA | 2218600 | 6/1998 |
| CA | 2215939 | 8/1999 |
| CA | 2226497 | 10/1999 |
| CA | 2243905 | 1/2000 |
| CA | 2255256 | 1/2000 |
| CA | 2244537 | 2/2000 |
| CA | 2418885 | 8/2003 |
| CA | 2502343 | 5/2004 |
| CA | 2502392 | 5/2004 |
| CA | 2499450 | 9/2005 |
| CA | 2577217 | 1/2006 |
| CA | 2629202 | 4/2008 |
| CA | 2716118 A1 | 8/2008 |
| CA | 2681963 | 10/2008 |
| CA | 2751134 A1 | 12/2011 |
| CA | 2855742 A1 | 5/2013 |
| CH | 317758 | 1/1957 |
| CH | 669235 A5 | 2/1989 |
| CN | 2529936 | 1/2003 |
| DE | 1684357 | 4/1967 |
| DE | 1812590 | 6/1970 |
| DE | 2062723 | 8/1972 |
| DE | 3003446 | 8/1981 |
| DE | 3234489 | 3/1984 |
| DE | 3727956 | 5/1988 |
| DE | 29803155 | 6/1998 |
| EP | 0025420 | 3/1981 |
| EP | 0055504 | 7/1982 |
| EP | 0141782 | 5/1985 |
| EP | 0179046 A2 | 4/1986 |
| EP | 0757137 | 2/1997 |
| EP | 2169133 A2 | 3/2010 |
| FR | 0507787 | 7/1920 |
| FR | 1381945 | 11/1964 |
| FR | 1603005 | 4/1971 |
| FR | 2364314 D1 | 4/1978 |
| FR | 2535417 | 5/1984 |
| FR | 2721054 | 6/1994 |
| FR | 2717848 | 9/1995 |
| FR | 2669364 A1 | 3/2012 |
| GB | 137221 | 1/1920 |
| GB | 779916 | 7/1957 |
| GB | 1243173 | 8/1971 |
| GB | 1253447 | 11/1971 |
| GB | 2161661 | 1/1985 |
| GB | 2205624 | 12/1988 |
| JP | 05133028 | 5/1993 |
| JP | 09041612 | 2/1997 |
| JP | 2008223335 | 9/2008 |
| SE | 206538 | 8/1966 |
| WO | 8204088 | 11/1982 |
| WO | 9500724 | 1/1995 |
| WO | 9607799 | 3/1996 |
| WO | 9635845 | 11/1996 |
| WO | 9743496 | 11/1997 |
| WO | 0163066 | 8/2001 |
| WO | 0173240 | 10/2001 |
| WO | 03006760 | 1/2003 |
| WO | 2004088064 | 10/2004 |
| WO | 2005/040526 | 5/2005 |
| WO | 08119178 | 10/2008 |
| WO | 09059410 | 5/2009 |
| WO | 09092158 | 7/2009 |

(56) References Cited

FOREIGN PATENT DOCUMENTS

| WO | 2010012061 A1 | 2/2010 |
| WO | 2010037211 | 4/2010 |
| WO | 2010078645 | 7/2010 |

OTHER PUBLICATIONS

Vector Corrosion Technologies Marketing Materials, 2007.
Vector Corrosion Technologies Marketing Materials, 2008.
Digigraph Brochure, Building Systems using PVC extrusions and concrete, accessed online Jan. 2012.
Digigraph Guide, Digigraph Systems Inc., Installation Guide for the Digigraph Construction System Composed of PVC Extrusions and Concrete, accessed online Jan. 2012.
The Digigraph System, http://www.digigraph-housing.com/web/system.ht, accessed online Jan. 2012.

\* cited by examiner

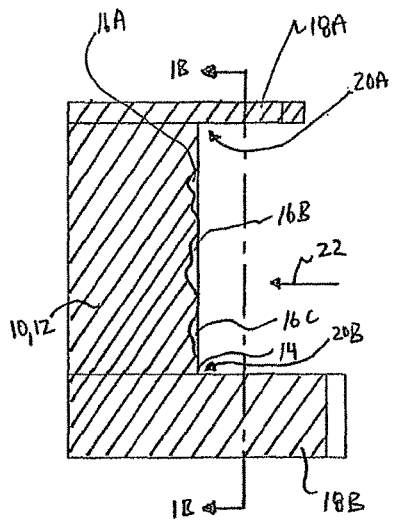 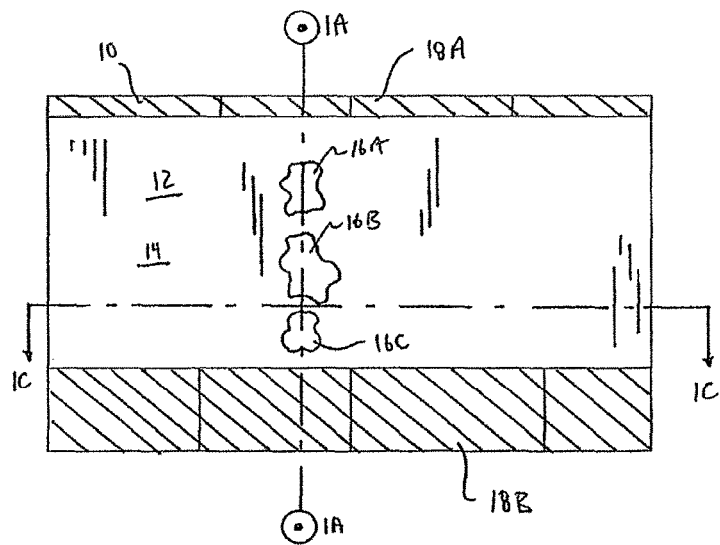
FIGURE 1A
FIGURE 1B
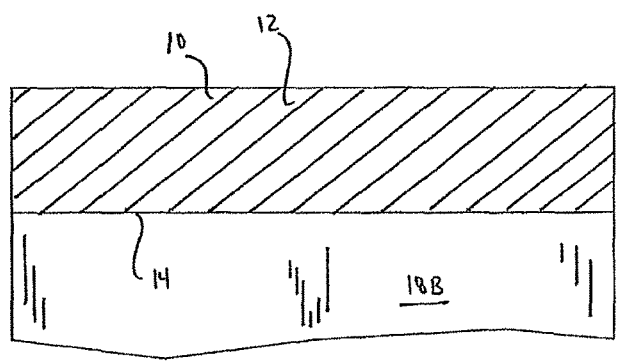
FIGURE 1C

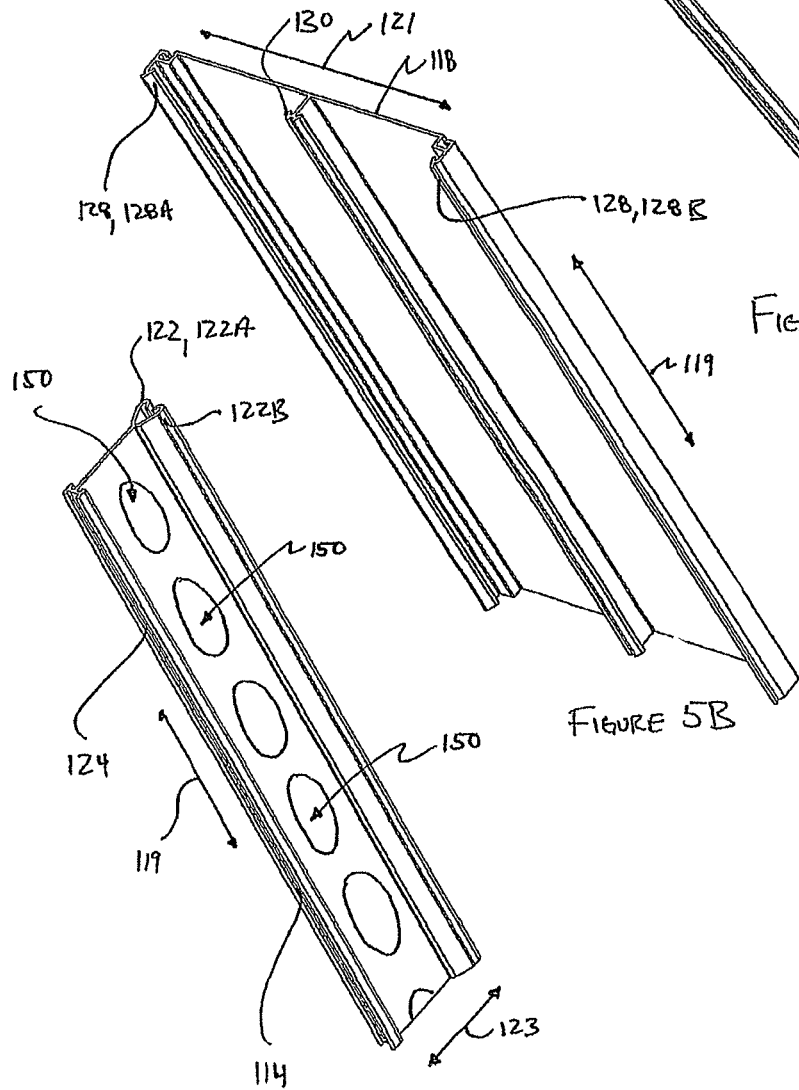

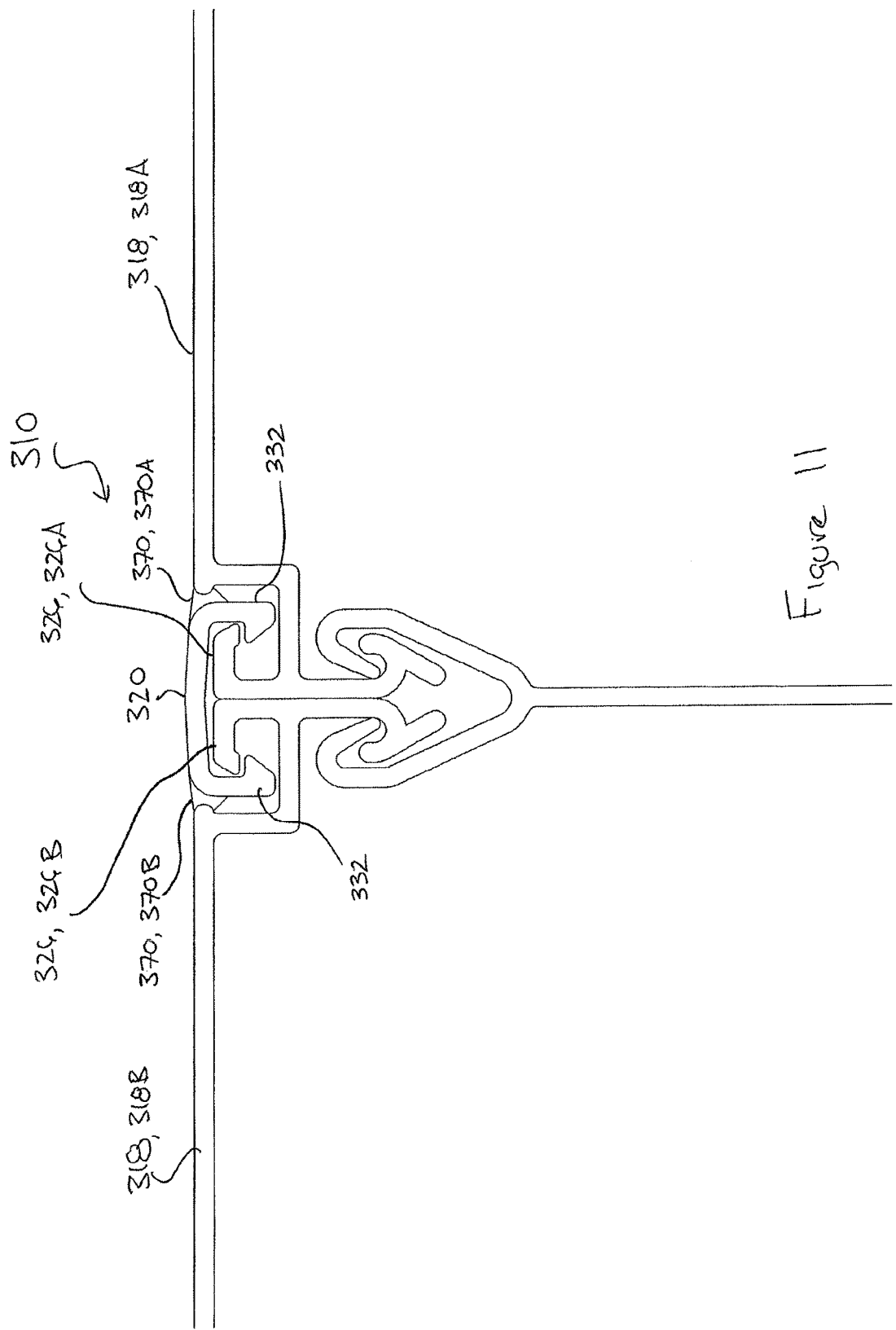

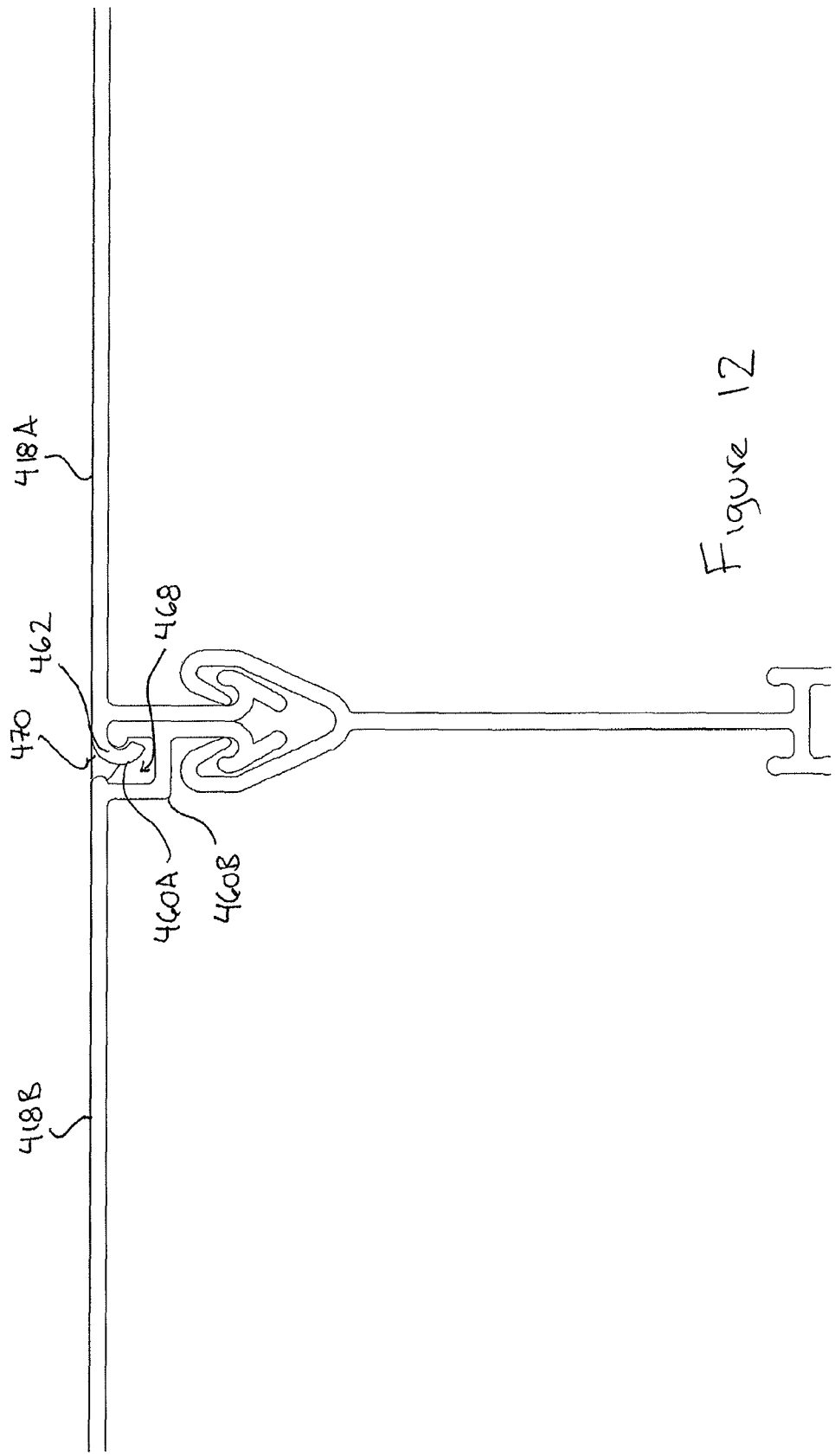

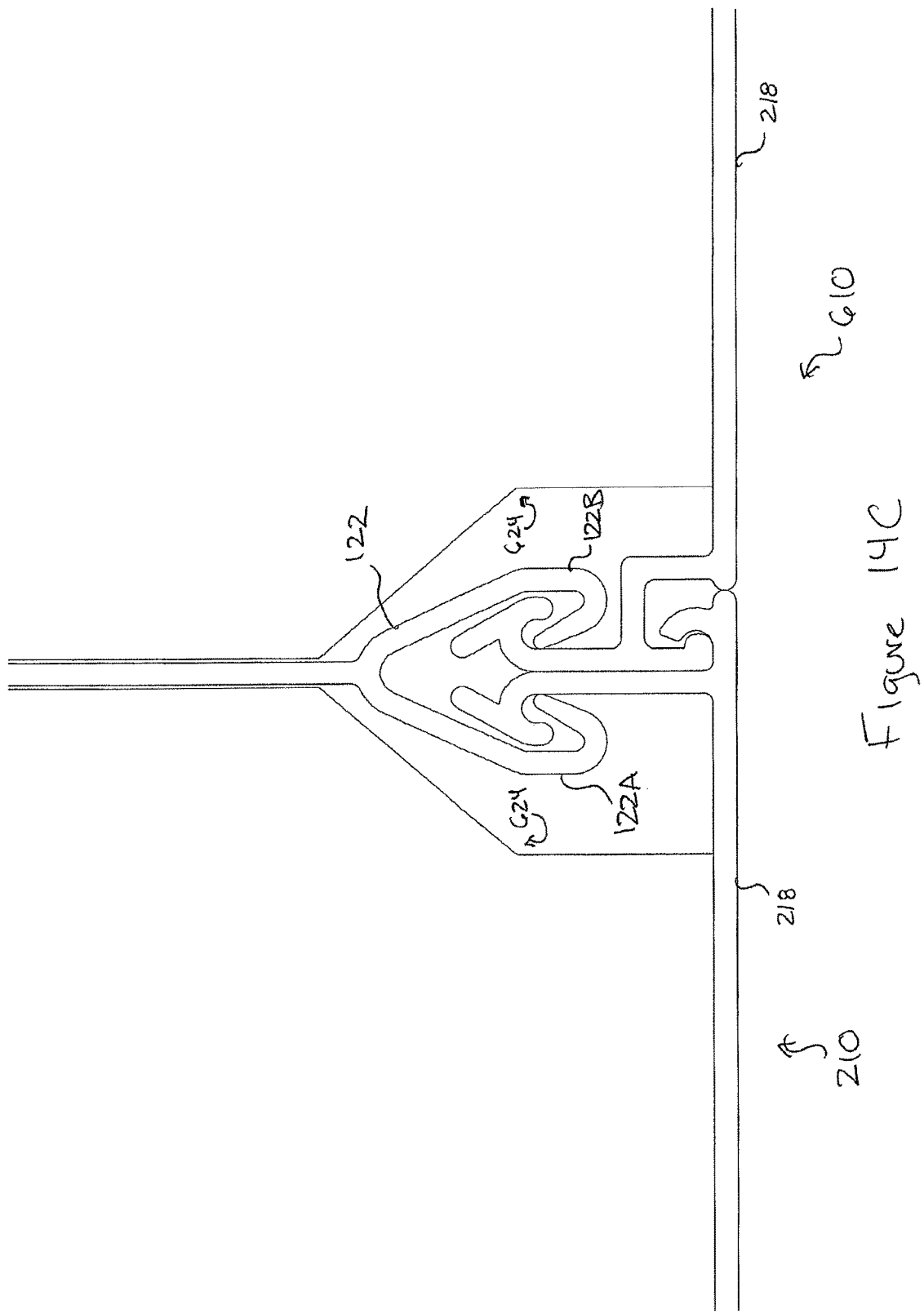

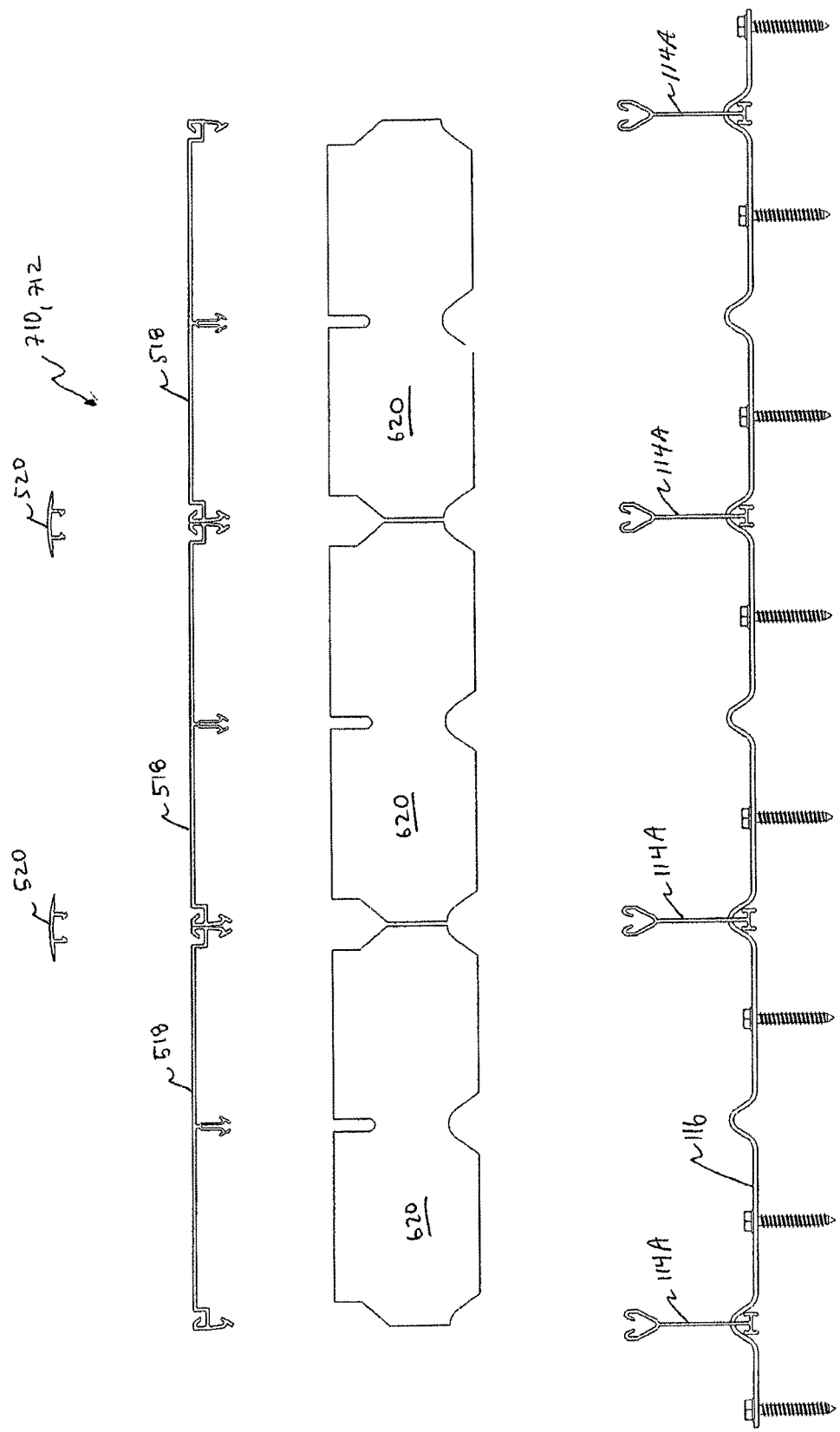

METHOD FOR RESTORING, REPAIRING, REINFORCING, PROTECTING, INSULATING AND/OR CLADDING A VARIETY OF STRUCTURES

RELATED APPLICATIONS

This application is a continuation of PCT application No. PCT/2011/050414 which was filed 6 Jul. 2011 and which claims the benefit of the priority of U.S. application No. 61/361,833 filed 6 Jul. 2010. Both PCT application No. PCT/2011/050414 and U.S. application No. 61/361,833 are hereby incorporated herein by reference.

TECHNICAL FIELD

The invention relates to methods and apparatus for restoring, repairing, reinforcing, protecting, insulating and/or cladding a variety of structures. Some embodiments provide formworks (or portions thereof) for containing concrete or other curable material(s) until such curable materials are permitted to cure.

BACKGROUND

Concrete is used to construct a variety of structures, such as building walls and floors, bridge supports, dams, columns, raised platforms and the like. Typically, concrete structures are formed using embedded reinforcement bars (often referred to as rebar) or similar steel reinforcement material, which provides the resultant structure with increased strength. Over time, corrosion of the embedded reinforcement material can impair the integrity of the embedded reinforcement material, the surrounding concrete and the overall structure. Similar degradation of structural integrity can occur with or without corrosion over sufficiently long periods of time, in structures subject to large forces, in structures deployed in harsh environments, in structures coming into contact with destructive materials or the like.

FIGS. 1A, 1B and 1C show a number of partial cross-sectional views of an exemplary damaged structure 10. Structure 10 includes a first portion (e.g. a wall) 12 having a surface 14 that is damaged in regions 16A, 16B, 16C. In the illustrated example of FIGS. 1A and 1B, damaged regions 16A, 16B, 16C represent regions where surface 14 is indented—i.e. the damage to structure 10 has changed the cross-sectional shape of portion 12 in damaged regions 16A, 16B, 16C.

There is a desire for methods and apparatus for repairing and/or restoring existing structures which have been degraded or which are otherwise in need of repair and/or restoration.

Exemplary structure 10 also includes portions 18A, 18B on opposing sides of portion 12. In the case where portion 12 is a wall, portions 18A, 18B may represent a floor and ceiling, for example. Portions 18A, 18B of structure 10 respectively form inside corners 20A, 20B with portion 12. Portions 18A, 18B constrain the ability to work in a vicinity of portion 12 and, in particular, in a vicinity of surface 14 which is in need of repair and/or restoration. For example, it may not be possible to access surface 14 of portion 12 by moving in one or more directions parallel with surface 14 from one side of portion 18A (or 18B) to the opposing side of portion 18A (or 18B). Instead, it may be necessary or desirable to access surface 14 from a direction normal to surface 14 (e.g. in direction 22 (FIG. 1A).

There is a general desire to repair and/or restore existing structures wherein there are constraints on the ability to access the portion(s) and/or surface(s) of the existing structures.

Constraints on access to existing structures (and/or portion(s) and/or surface(s) thereof) in need of repair and/or restoration are not limited to constraints imposed by other portions of the same structure, as is the case of exemplary structure 10 of FIGS. 1A, 1B and 1C. Access to existing structures may be limited by other constraints, such as, by way of non-limiting example, the ground, a body of water, other structures and/or the like.

Some structures have been fabricated with inferior or sub-standard structural integrity. By way of non-limiting example, some older structures may have been fabricated in accordance with seismic engineering specifications that are lower than, or otherwise lack conformity with, current seismic engineering standards. There is a desire to reinforce existing structures to upgrade their structural integrity or other aspects thereof. There is a corresponding desire to reinforce existing structures wherein there are constraints on the ability to access portion(s) and/or surface(s) of the existing structures.

There is also a desire to protect existing structures from damage which may be caused by, or related to, the environments in which the existing structures are deployed and/or the materials which come into contact with the existing structures. By way of non-limiting example, structures fabricated from metal or concrete can be damaged when they are deployed in environments that are in or near salt water or in environments where the structures are exposed to salt or other chemicals used to de-ice roads. There is a corresponding desire to protect existing structures wherein there are constraints on the ability to access portion(s) and/or surface(s) of the existing structures.

The desire to repair, restore, reinforce and/or protect existing structures is not limited to concrete structures. There are similar desires for existing structures fabricated from other materials.

BRIEF DESCRIPTION OF THE DRAWINGS

In drawings which depict non-limiting embodiments of the invention:

FIGS. 1A, 1B and 1C (collectively, FIG. 1) respectively depict partial cross-sectional views of an existing structure along the lines 1A-1A, 1B-1B and 1C-1C;

FIGS. 5A, 5B, 5C and 5D (collectively, FIG. 5) are isometric views of components of the FIG. 2 formwork including a standoff, a panel, a connector cap and a standoff retainer respectively;

FIG. 11 shows a magnified, partial cross-sectional view of a formwork apparatus according to a particular embodiment;

FIG. 12 shows a magnified, partial cross-sectional view of a formwork apparatus according to a particular embodiment;

FIGS. 14A, 14B and 14C show magnified, partial cross-sectional views of an insulation and cladding system according to a particular embodiment;

FIG. 15 is an exploded view of insulation and cladding system according to particular embodiment;

DETAILED DESCRIPTION

Figure 2A:
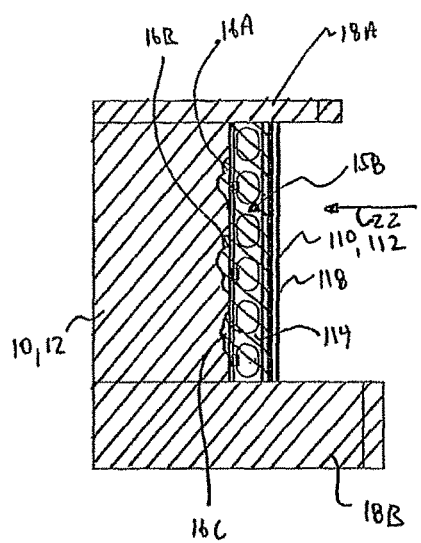
FIGS. 2A, 2B and 2C (collectively, FIG. 2) respectively depict various cross-sectional views of a repair structure and formwork apparatus for repairing the FIG. 1 existing structure from the same perspectives as FIGS. 1A, 1B and 1C.
Figure 2B:
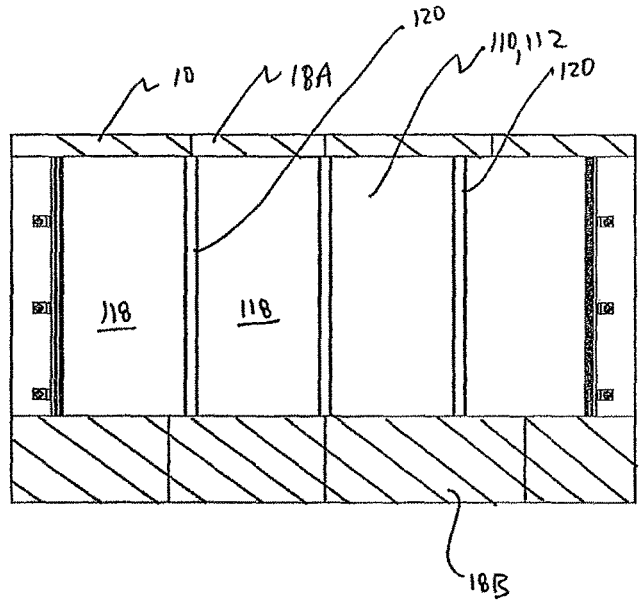
Figure 2C:
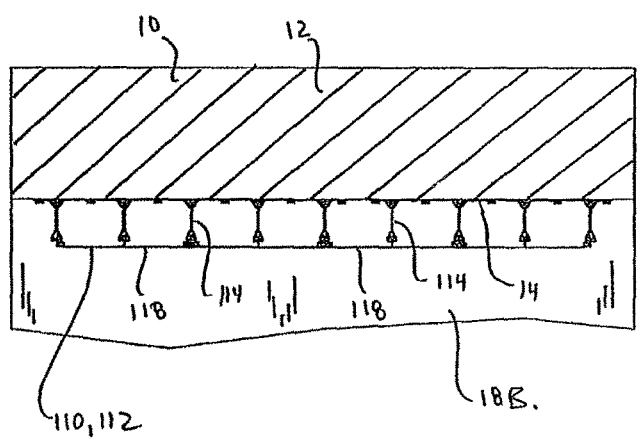
Figure 3:
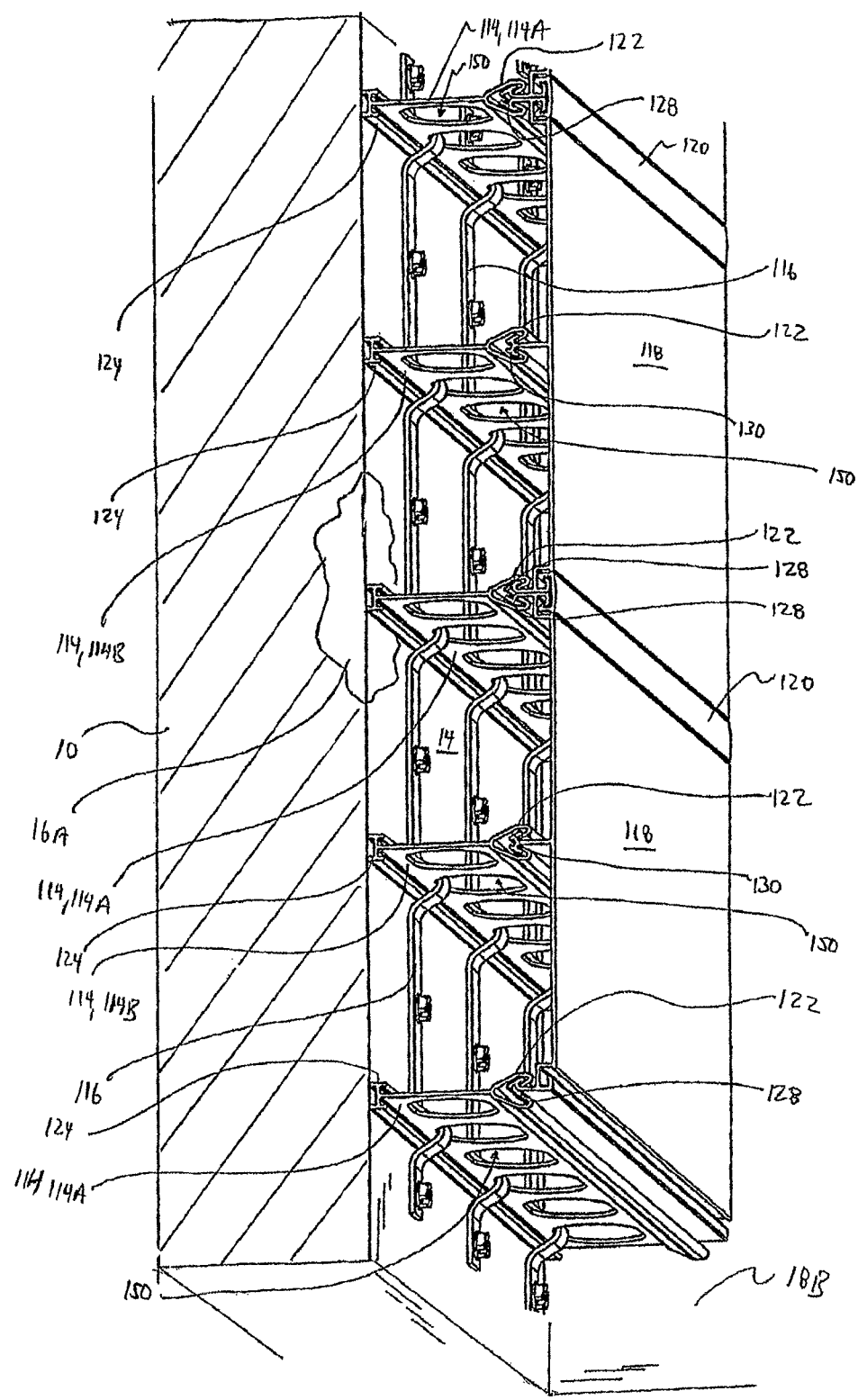
FIG. 3 is a partial cross-sectional isometric view of the FIG. 2 formwork and the FIG. 1 existing structure.
Figure 4:
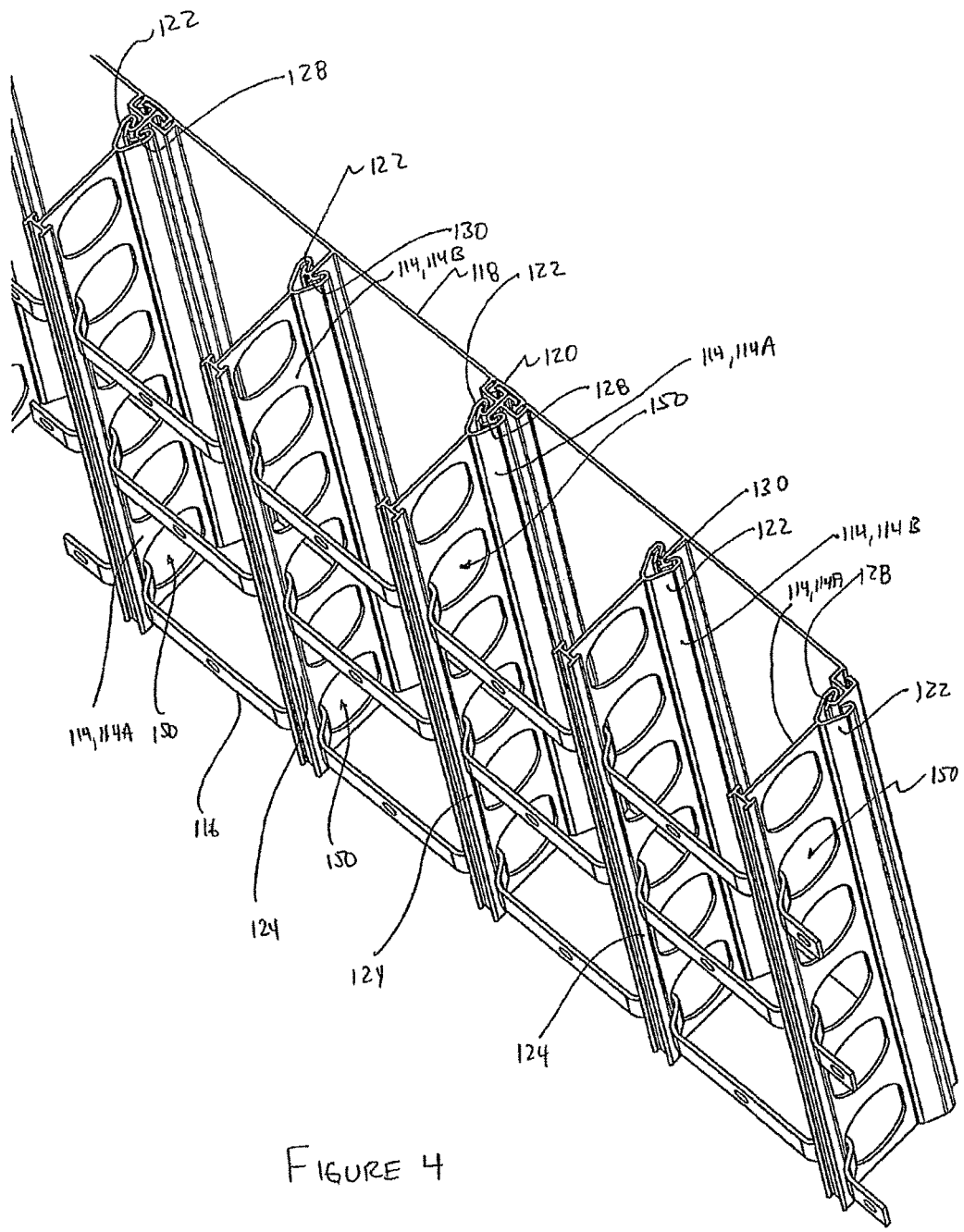
FIG. 4 is a partial cross-sectional isometric view of the FIG. 2 formwork with the FIG. 1 existing structure removed for clarity.
Figure 6A:
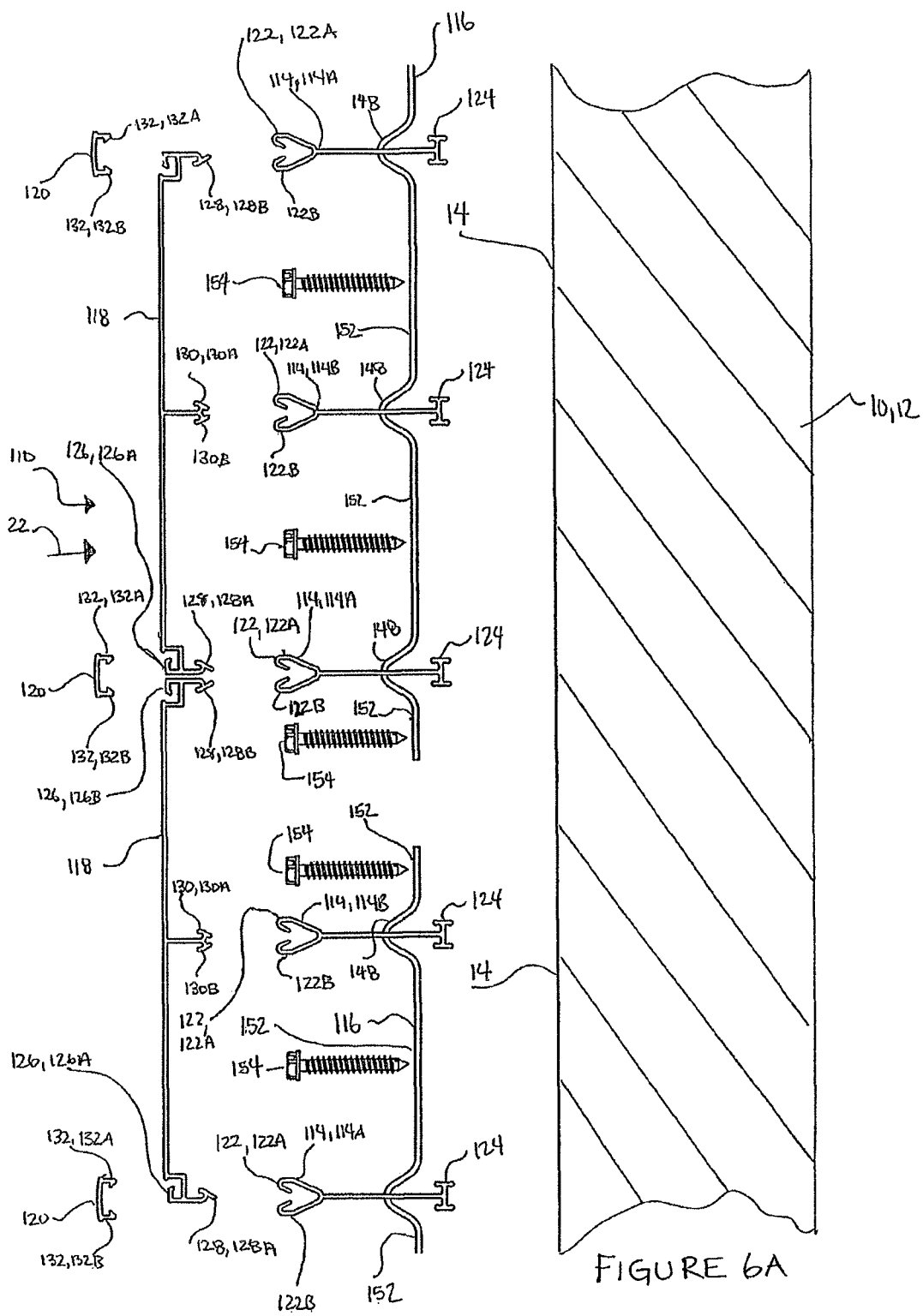
FIGS. 6A and 6B (collectively, FIG. 6) are partial, magnified cross-sectional views (exploded (FIG. 6A) and assembled (FIG. 6B)) which show a method for assembling the FIG. 2 formwork and using same to repair the FIG. 1 structure.
Figure 6B:
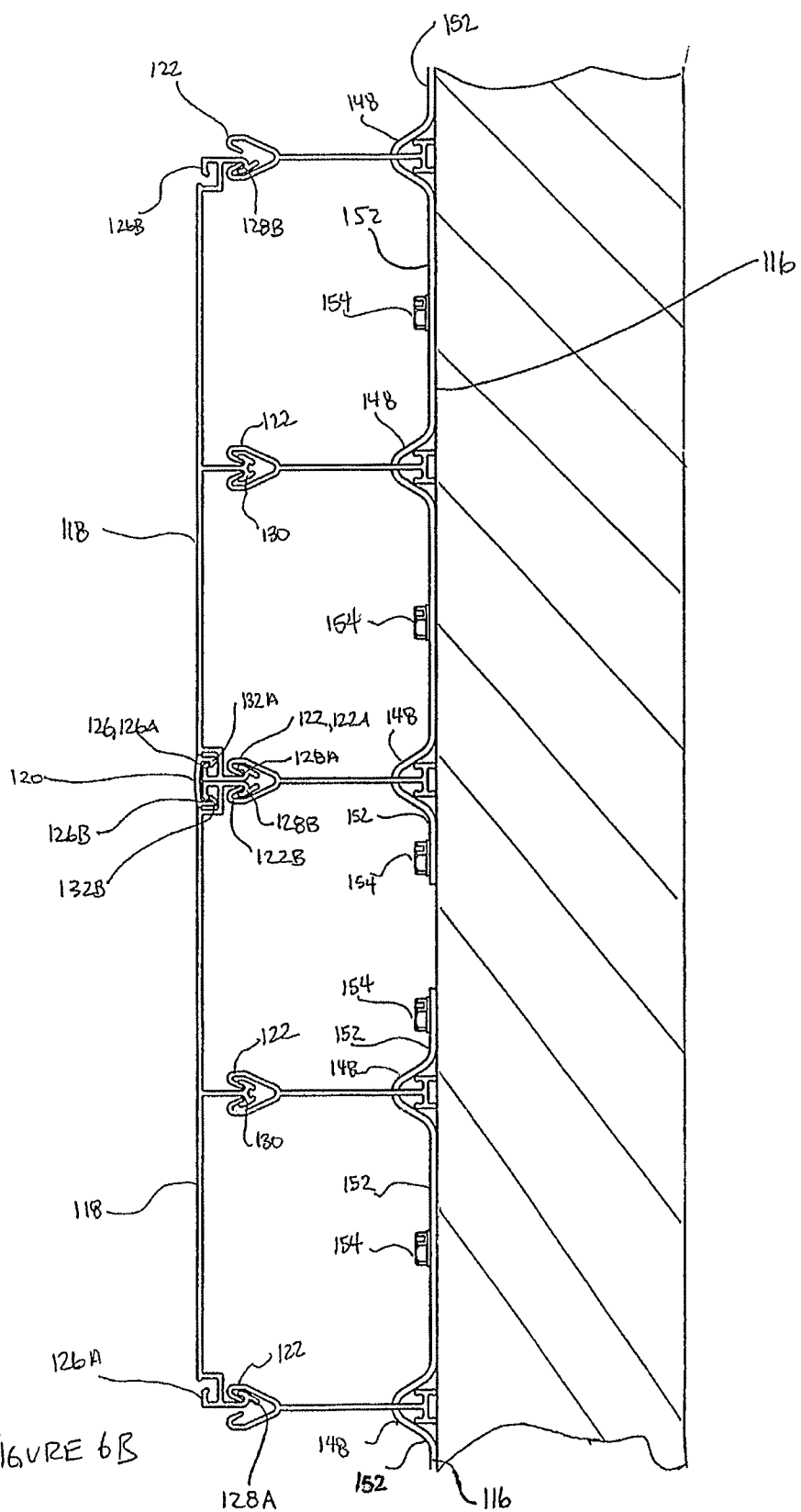

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Apparatus and methods according to various embodiments may be used to repair, restore, reinforce, protect, insulate and/or clad existing structures. Some embodiments provided formworks (or portions thereof) or the like for containing concrete and/or similar curable materials until such curable materials cure. For brevity, in this disclosure (including any accompanying claims), apparatus and methods according to various embodiments may be described as being used to "repair" existing structures. In this context, the verb "to repair" and its various derivatives should be understood to have a broad meaning which may include, without limitation, to restore, to reinforce and/or to protect the existing structure. In some applications, which will be evident to those skilled in the art, the verb "to repair" and its various derivatives may additionally or alternatively be understood to include, without limitation, to insulate and/or to clad the existing structure. Similarly, structures added to existing structures in accordance with particular embodiments of the invention may be referred to in this description and the accompanying claims as "repair structures". However, such "repair structures" should be understood in a broad context to include additive structures which may, without limitation, repair, restore, reinforce and/or protect existing structures. In some applications, which will be evident to those skilled in the art, such "repair structures" may be understood to include structures which may, without limitation, insulate and/or clad existing structures. Further, some of the existing structures shown and described herein exhibit damaged regions which may be repaired in accordance with particular embodiments of the invention. In general, however, it is not necessary that existing structures be damaged and the methods and apparatus of particular aspects of the invention may be used to repair, restore, reinforce or protect existing structures which may be damaged or undamaged. Similarly, in some applications, which will be evident to those skilled in the art, methods and apparatus of particular aspects of the invention may be understood to insulate and/or clad existing structures which may be damaged or undamaged.

One aspect of the invention provides a method for repairing an existing structure to cover at least a portion of the existing structure with a repair structure. The method comprises: mounting one or more standoff retainers to a surface of the existing structure; coupling one or more standoffs to the standoff retainers such that the standoffs extend away from the existing structure; coupling one or more cladding panels to the standoffs by forcing the cladding panels into engagement with the standoffs in one or more directions generally normal to the surface of the existing structure and orthogonal to a plane (or tangential plane) of the cladding panels at the locations of the panel connector components such that the panels are spaced apart from the surface of the existing structure to provide a space therebetween; and introducing a curable material to the space between the panels and the existing structure, the panels acting as at least a portion of a formwork for containing the curable material until the curable material cures to provide a repair structure cladded, at least in part, by the panels. Forcing the cladding panels into contact with the standoffs may comprise initially deforming one or more standoff connector components of the standoffs and/or one or more panel connector components of the panels and then, subsequently, permitting restorative deformation forces to at least partially restore a shape of the deformed connector component(s) to thereby lock the standoff connector components to the panel connector components.

Another aspect of the invention provides an apparatus for repairing an existing structure to cover at least a portion of a surface of the existing structure with a repair structure. The apparatus comprises: one or more standoff retainers mounted to the existing structure; one or more standoffs coupled to the standoff retainers, the standoffs extending away from the surface of the existing structure and having one or more standoff connector components at their ends distal from the surface of the existing structure; and one or more cladding panels having one or more panel connector components, the panels coupleable to the standoffs by forcing the panel connector components into engagement with corresponding standoff connector components in one or more directions generally normal to the surface of the existing structure and orthogonal to a plane (or tangential plane) of the cladding panels at the locations of the panel connector components such that the panels are spaced apart from the existing structure to provide a space therebetween. Curable material is introduced to the space between the panels and the existing structure and the panels act as at least a portion of a formwork for containing the curable material until the curable material cures to provide a repair structure cladded, at least in part, by the panels. The standoff connector components and/or the panel connector components (or portions thereof) may be shaped such that when the panel connector components are forced into engagement with the standoff connector components in the one or more directions generally normal to the surface of the existing structure, the standoff connector components and/or the panel connector components (or portions thereof) are initially deformable and, subsequently, exert restorative deformation forces to at least partially restore their shape to thereby lock the standoff connector components to the panel connector components.

A further aspect of the invention provides a method for covering at least a portion of a surface of an existing structure with a repair structure, the method comprising coupling a standoff to the existing structure, such that the standoff projects outwardly away from the surface of the existing structure, and coupling a cladding panel to the standoff by forcing the panel, in an inward direction toward the surface of the existing structure, into engagement with a standoff connector component of the standoff at a location spaced apart from the surface of the existing structure. In some embodiments according to this aspect:

a tangential plane of the panel where it engages the standoff connector component is generally parallel to the surface of the existing structure where the standoff projects outwardly from the surface of the existing structure; and/or a tangential plane of the panel where it engages the standoff connector component is generally normal to an outward direction in which the standoff projects outwardly from the surface of the existing structure.

Embodiments of this aspect may comprise introducing a curable material to the space between the cladding panel and the existing structure, the panel acting as at least a portion of a formwork for containing the curable material until the curable material cures to provide a repair structure cladded, at least in part, by the panel. In some embodiments of this aspect forcing the panel into engagement with the connector component of the standoff comprises deforming at least one of the standoff connector component and a panel connector component of the panel, and then, subsequently, permitting restorative deformation forces of the at least one of the standoff connector component and the panel connector component to at least partially restore a shape thereof to thereby lock the standoff connector component to the panel connector component.

Some embodiments of this aspect comprise moving the panel connector component to an engaged configuration in which the restorative deformation forces of the at least one of the standoff connector component and the panel connector component at least partially restore a shape thereof. Deforming the at least one of the standoff connector component and the panel connector component may comprise causing a deformation-causing portion of the at least one of the standoff connector component and the panel connector component and a resiliently deformable portion of the at least one of the standoff connector component and the panel connector component to move against one another, thereby causing the deformation-causing portion to deform the resiliently deformable portion.

Yet another aspect provides apparatus for repairing at least a portion of a surface of an existing structure comprising a standoff coupled to the existing structure to project outwardly away from the surface of the existing structure and a cladding panel forced, in an inward direction toward the surface of the existing structure, into engagement with a standoff connector component of the standoff at a location spaced apart from the surface of the existing structure. The location of the engagement between the panel and the standoff connector component may create a space between the cladding panel and the surface of the existing structure. Some embodiments according to this aspect comprise a curable material introduced into the space between the cladding panel and the existing structure, the panel at least partially containing the curable material until the curable material cures to provide a repair structure cladded, at least in part, by the panel. In some embodiments according to this aspect:

the engagement between the panel and the standoff connector component comprises a connection between a panel connector component of the panel and the standoff connector component and wherein at least one of the standoff connector component and the panel connector component is configured to be initially deformed when the panel is forced into engagement with the standoff connector component, and configured to have a shape thereof at least partially restored by restorative deformation forces when the panel connector component is moved to an engaged configuration;

one of the standoff connector component and the panel connector component comprises a deformation-causing portion and the other one of the standoff connector component and the panel connector component comprises a resiliently deformable portion, and wherein the resiliently deformable portion and deformation-causing portion are configured to move against one another when the panel is forced into engagement with the standoff connector component, thereby deforming the resiliently deformable portion;

the deformation-causing portion is also resiliently deformable and is configured to be deformed when the resiliently deformable portion and the deformation-causing portion move against one another;

the normal to the surface of the existing structure where the standoff extends from the surface of the existing structure is intersected by a tangent plane to the deformation-causing portion where it moves against the resiliently deformable portion; and/or the normal to the surface of the existing structure where the standoff extends from the surface of the existing structure is intersected by a tangent plane to the resiliently deformable portion where it moves against the deformation-causing portion.

In some embodiments according to this aspect the deformation-causing portion has a first transverse dimension at its inward end, a second transverse dimension at its outward end, a third transverse dimension at a mid-section intermediate its inward and outward ends, the third transverse dimension wider than the first and second transverse dimensions, and the resiliently deformable portion defines a transverse opening narrower than the third transverse dimension when the resiliently deformable portion is in an undeformed configuration. In some embodiments according to this aspect the deformation-causing portion defines a transverse opening, and wherein the resiliently deformable portion has:

a first transverse dimension at its inward end, a second transverse dimension at its outward end, a third transverse dimension at a mid-section intermediate its inward and outward ends, the third transverse dimension wider than the first and second transverse dimensions when the resiliently deformable portion is in an undeformed configuration.

Aspects of the invention also provide repair structures fabricated using the methods and formwork apparatus described herein. Kits may also be provided in accordance with some aspects of the invention. Such kits may comprise portions of the apparatus according to various embodiments and may facilitate effecting one or more methods according to various embodiments.

FIGS. 2-8 depict various views of a formwork apparatus 110 which may be used to build a repair structure 112 and to thereby repair the FIG. 1 existing structure 10 according to a particular embodiment. As shown best in FIGS. 5 and 6, formwork 110 of the illustrated embodiment comprises a plurality of standoffs 114, one or more standoff retainers 116, one or more panels 118 and one or more optional connector caps 120. In currently preferred embodiments, standoffs 114, panels 118 and connector caps 120 are fabricated from suitable plastic (e.g. polyvinyl chloride (PVC)) using an extrusion process and standoff retainers 116 are fabricated from suitable metal alloys using a suitable metal bending or stamping process. It will be understood, however, that standoffs 114, standoff retainers 116, panels 118 and/or cap connectors 120 could be fabricated from other suitable materials, such as, by way of non-limiting example, other suitable plastics, other suitable metals or metal alloys, polymeric materials, fiberglass, carbon fiber material or the like and that standoffs 114, standoff retainers 116, panels 118 and/or cap connectors 120 could be fabricated using any other suitable fabrication techniques.

Standoff retainers 116 are coupled to standoffs 114 and to existing structure 10 such that standoffs 114 are mounted to existing structure 10 and extend away from surface 14 thereof. Standoffs 114 are elongated in longitudinal dimension 119 and extend in inward/outward direction 123. Standoffs 114 comprise heads 124 at their edges closest to surface 14 of existing structure 10. Heads 124 may, but need not necessarily comprise connector components. Standoffs 114 comprise standoff connector components 122 at their opposing edges (i.e. at their edges distal from surface 14 of existing structure 10). Heads 124 of standoffs 114 may abut against surface 14 when standoffs 114 are mounted to existing structure 10 as aforesaid. In the illustrated embodiment, heads 124 of standoffs 114 have an "H-shape" in cross-section (see FIG. 6). This is not necessary. In other embodiments, heads 124 of standoffs 114 may have other suitable shapes. Other suitable shapes for heads 124 of standoffs 114 are disclosed, for example, in co-owned Patent Cooperation Treaty application No. PCT/CA2010/000003 and U.S. patent application Ser. No. 12/794,607 which are hereby incorporated herein by reference.

Panels 118 of the illustrated embodiment are generally planar with longitudinal dimensions 119 and transverse widths 121. Panels 22 may have generally uniform cross-sections in the direction of their longitudinal dimensions 119, although this is not necessary. Panels 118 comprise connector components 128, 130 which are complementary to standoff connector components 122. Standoff connector components 122 are coupleable to corresponding panel connector components 128, 130 to thereby couple panels 118 to standoffs 114 such that panels 118 are positioned at locations spaced apart from existing structure 10 and from surface 14 thereof. When panels 118 are coupled to standoffs 114, the transverse widths 121 of panels 118 may extend generally orthogonally to the inward/outward dimension 123 of standoffs 114.

After standoffs 114 are mounted to structure 10 as described above, the coupling of standoff connector components 122 and panel connector components 128, 130 may be effected by aligning panels 118 with standoffs 114 and forcing panels 118 into engagement with standoffs 114 in directions 22 generally normal to surface 14 and generally orthogonal to the plane of panels 118. Forcing panels 118 toward standoffs 114 in directions 22 may initially deform standoff connector components 122 and/or panels connector components 128, 130 and, subsequently, permit restorative deformation forces to at least partially restore the shape of the deformed connector components 122, 128, 130 to thereby lock standoff connector components 122 to panel connector components 128, 130 and couple panels 118 to standoffs 114.

In the illustrated embodiment, there are two types of connections between panels 118 and standoffs 114. Formwork 110 comprises a plurality of edge-connecting standoffs 114A, each of which connects a pair of panels 118 in an edge-adjacent relationship and a plurality of interior standoffs 114B, each of which connects to a single panel 118 at a location away from the transverse edges of panel 118. Each panel 118 of the illustrated embodiment comprises edge panel connector components 128 which engage standoff connector components 122 of edge-connecting standoffs 114A and interior connector components 130 which engage standoff connector components 122 of interior standoffs 114B.

Figure 7A:
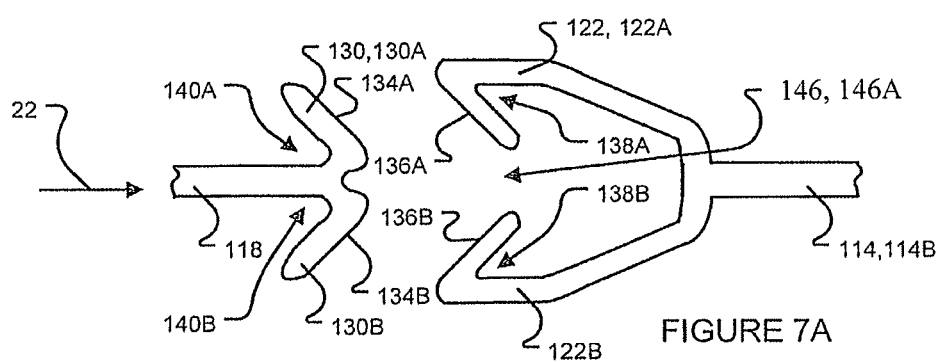
FIGS. 7A-7D (collectively, FIG. 7) show magnified cross-sectional views of the process of coupling an interior panel connector component of the FIG. 2 formwork to an interior standoff connector component of the FIG. 2 formwork.
Figure 7B:
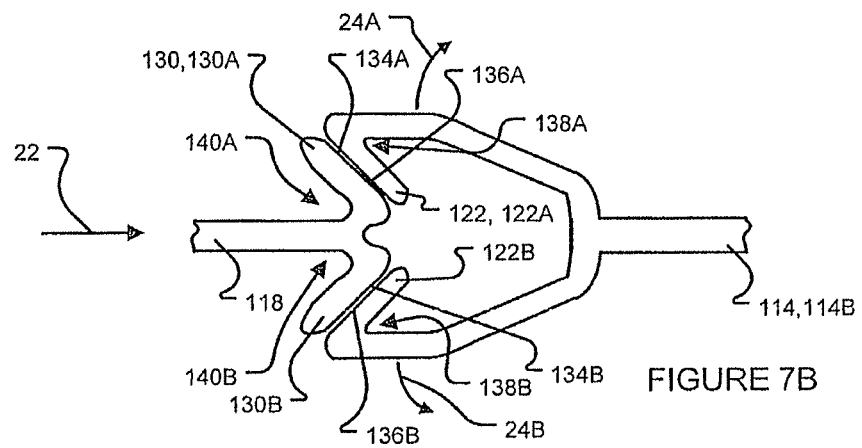
Figure 7C:
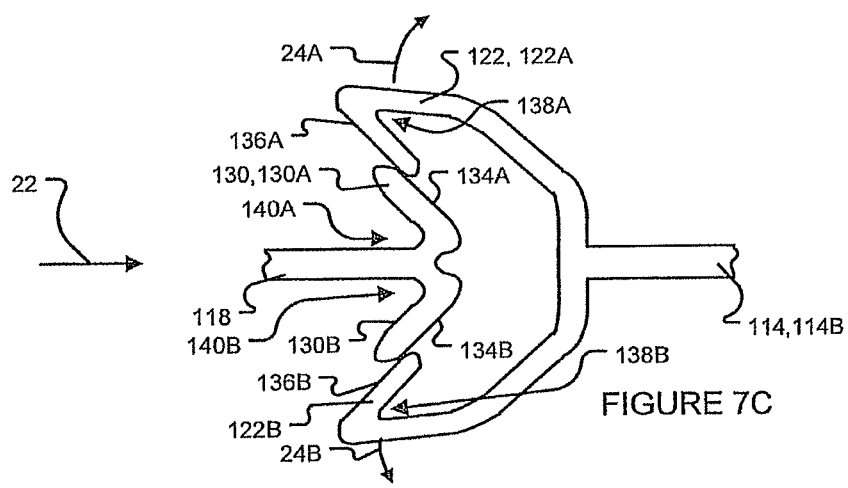
Figure 7D:
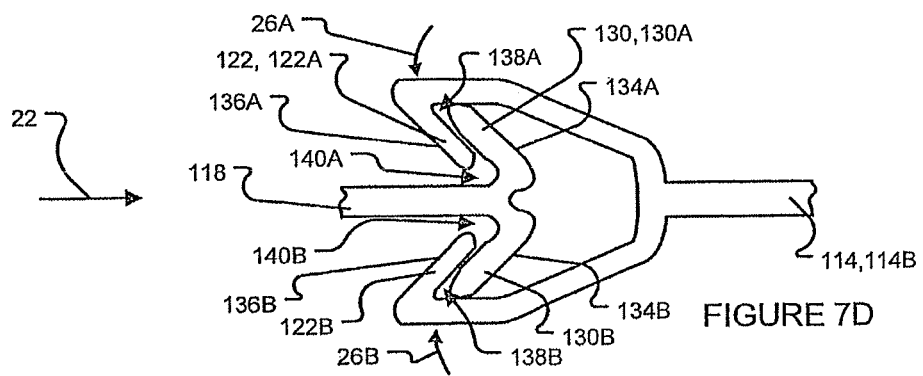
Figure 8A:
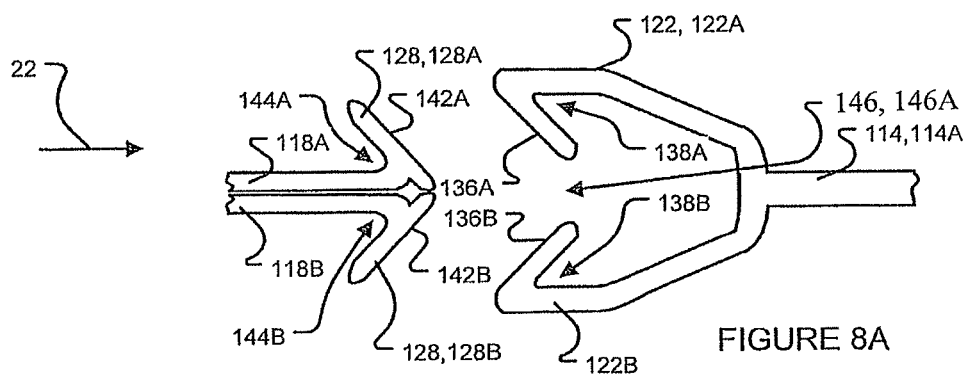
FIGS. 8A-8D (collectively, FIG. 8) show magnified cross-sectional views of the process of coupling the edge panel connector components of a pair of panels of the FIG. 2 formwork to an edge-connecting standoff connector component of the FIG. 2 formwork.
Figure 8B:
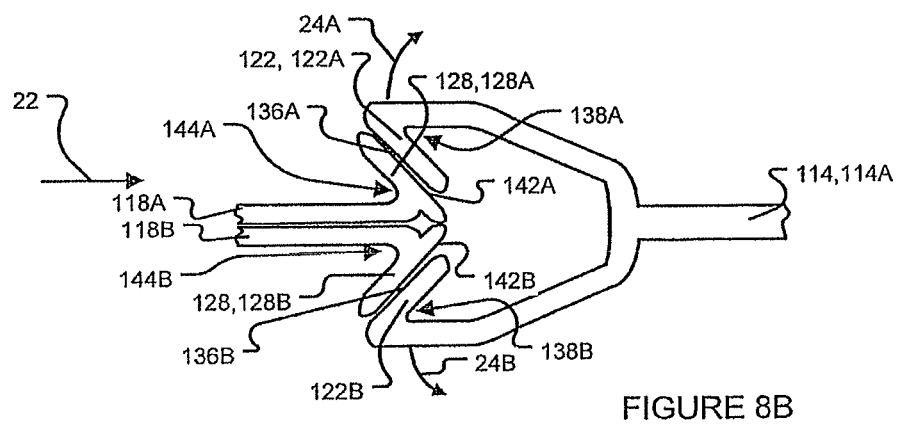
Figure 8C:
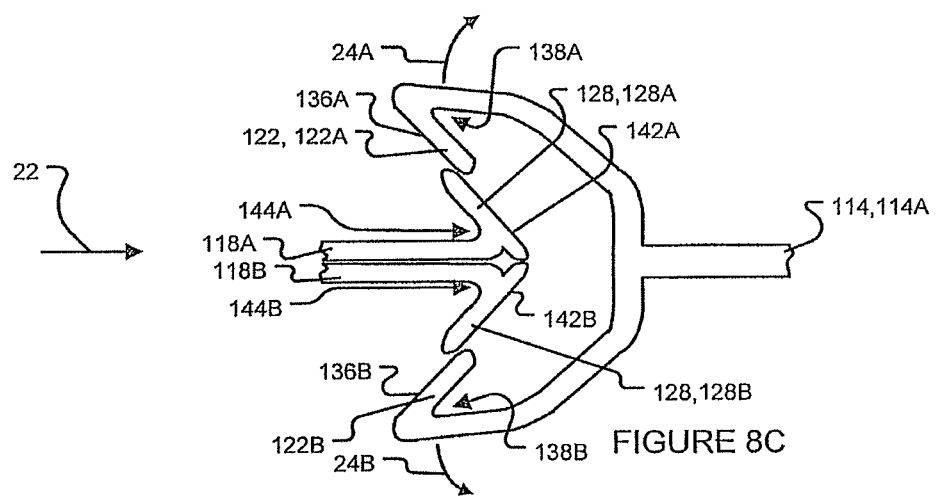
Figure 8D:
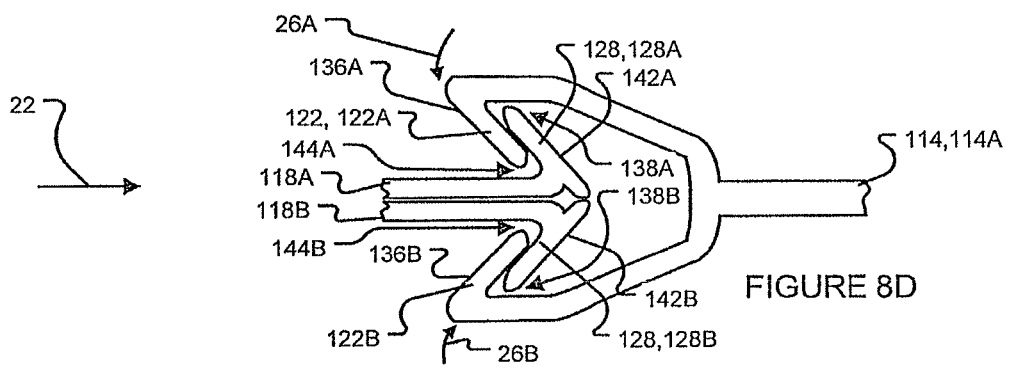

The engagement of interior connector components 130 to standoff connector components 122 of interior standoffs 114B is shown best in FIG. 7D and the engagement of edge panel connector components 128 to standoff connector components 122 of edge-connecting standoffs 114A is shown best in FIG. 8D. In the illustrated embodiment, standoff connector components 122 comprise a pair of hooked arms 122A, 122B. In the case of interior standoffs 114B (FIG. 7D), hooked arms 122A, 122B of standoff connector component 122 engage complementary hooked arms 130A, 130B on an interior panel connector component 130 of a single panel 118 such that arms 122A, 122B of standoff connector components 122 extend into and terminate in concavities 140A, 140B of panel connector components 130 and arms 130A, 130B of panel connector components 130 extend into and terminate in concavities 138A, 138B of standoff connector component 122.

In the case of edge-connecting standoffs 114A (FIG. 8D):
hooked arm 122A engages a complementary hooked arm 128A of an edge panel connector component 128 on one edge of a first panel 118A such that arm 122A of standoff connector component 122 extends into and terminates in concavity 144A of panel connector component 128 and arm 128A of panel connector component 128 extends into and terminates in concavity 138A of standoff connector component 122; and
hooked arm 122B engages a complementary hooked arm 128B of an edge panel connector component 128 on an edge-adjacent second panel 118B such that arm 122B of standoff connector component 122 extends into and terminates in concavity 144B of panel connector component 128 and arm 128B of panel connector component 128 extends into and terminates in concavity 138B of standoff connector component 122.

This engagement of hooked arms 122A, 128A and hooked arms 122B, 128B couples the pair of panels 118A, 118B in an edge-adjacent relationship.

The process of coupling interior panel connector components 130 to standoff connector components 122 of interior standoffs 114B by forcing panels 118 against interior standoffs 114B in direction 22 is shown in FIGS. 7A-7D. In the illustrated embodiment, hooked arms 130A, 130B of interior panel connector components 130 comprise beveled surfaces 134A, 134B and hooked arms 122A, 122B of standoff connector components 122 of interior standoffs 114B comprise corresponding beveled surfaces 136A, 136B. Beveled surfaces 134A, 134B, 136A, 136B are angled toward one another as they extend in direction 22. Coupling interior panel connector component 130 to standoff connector component 122 involves aligning interior panel connector component 130 with a space 146 between hooked arms 122A, 122B of standoff connector component 122 (FIG. 7A). As interior panel connector component 130 is forced in direction 22 through a transverse opening 146A defined by hooked arms 122A, 122B into space 146 and against standoff connector component 122, beveled surfaces 134A, 134B abut against beveled surfaces 136A, 136B (FIG. 7B), causing a deformation of hooked arms 122A, 122B, which widens transverse opening 146A, as beveled surfaces 134A, 134B, 136A, 136B slide against one another (FIG. 7C) and panel connector component 130 passes transverse opening 146A into space 146. More particularly, hooked arm 122A of connector component 122 deforms in a direction 24A away from space 146 and hooked arm 122B of connector component deforms in a direction 24B away from space 146 to permit panel connector component 130 to pass transverse opening 146A and extend into space 146. Directions 24A, 24B may be comprise components which are aligned with the plane of panels 118.

As interior panel connector component 130 continues to be forced in direction 22, arms 122A, 122B deform in directions 24A, 24B past the edges of arms 130A, 130B (i.e. beveled surfaces 136A, 136B move past the edges of beveled surfaces 134A, 134B) and restorative deformation forces (e.g. elastic forces) cause arms 122A, 122B to move back in directions 26A, 26B such that arms 122A, 122B extend into concavities 140A, 140B of interior panel connector component 130 and arms 130A, 130B extend into concavities 138A, 138B of connector components 122. Directions 26A, 26B may be respectively opposed to directions 24A, 24B. Since interior panel connector component 130 is forced and extends into space 146 between arms 122A, 122B of standoff connector component 122, interior panel connector component 130 may be considered to be a "male" connector component corresponding to the "female" standoff connector component 122. In other embodiments, standoff connector components 122 may comprise male connector components and interior panel connector components 130 may comprise female connector components.

The process of coupling edge panel connector components 128 to standoff connector components 122 of edge-connecting standoffs 114A is similar to that of connecting interior panel connector components 130 to standoff connector components 122 of interior standoffs 114B and involves forcing a pair of edge-adjacent panels 118A, 118B against edge-connecting standoffs 114A in direction 22 as shown in FIGS. 8A-8D. In the illustrated embodiment, hooked arms 128A, 128B of edge panel connector components 128 comprise beveled surfaces 142A, 142B which are similar to beveled surfaces 134A, 134B of arms 130A, 130B of interior panel connector components 130. More particularly, when panels 118A, 118B are placed in edge-adjacent relationship, beveled surfaces 142A, 142B are angled toward one another as they extend in direction 22 and beveled surfaces 142A, 142B interact with corresponding beveled surfaces 136A, 136B of standoff connector components 122.

In the illustrated embodiment of FIGS. 8A-8D, coupling a pair of panels 118A, 188B to standoff connector component 122 involves placing panels 118A, 118B in edge-adjacent relationship such that the edges of panels 118A, 118B (and hooked arms 128A, 128B of connector components 128) are aligned with space 146 between hooked arms 122A, 122B of standoff connector component 122 (FIG. 8A). As panels 118A, 118B are forced in direction 22 through transverse opening 146A defined by hooked arms 122A, 122B into space 146 and against standoff connector component 122, beveled surfaces 142A, 142B abut against beveled surfaces 136A, 136B (FIG. 8B), causing a deformation of hooked arms 122A, 122B, which widens transverse opening 146A, as beveled surfaces 142A, 142B, 136A, 136B slide against one another (FIG. 8C) and panel connector components 128 passes transverse opening 146A into space 146. More particularly, hooked arm 122A of connector component 122 deforms in a direction 24A away from space 146 and hooked arm 122B of connector component deforms in a direction 24B away from space 146. Directions 24A, 24B may be comprise components which are aligned with the plane of panels 118A, 118B.

As panels 118A, 118B continue to be forced in direction 22, arms 122A, 122B deform in directions 24A, 24B past the edges of arms 128A, 128B (i.e. beveled surfaces 136A, 136B move past the edges of beveled surfaces 142A, 142B) and restorative deformation forces (e.g. elastic forces) cause arms 122A, 122B to move back in directions 26A, 26B such that arms 122A, 122B extend into concavities 144A, 144B of panel connector components 128 and arms 128A, 128B extend into concavities 138A, 138B of connector components 122. Directions 26A, 26B may be respectively opposed to directions 24A, 24B. Since panel connector components 128 are forced and extend into space 146 between arms 122A, 122B of standoff connector component 122, panel connector components 128 may be considered to be "male" connector components corresponding to the "female" standoff connector component 122. In other embodiments, standoff connector components 122 may comprise male connector components and panel connector components 128 may comprise female connector components.

It is not necessary that a pair of edge-adjacent panels 118A, 118B be simultaneously coupled to a standoff 114A as is the case in the illustrated embodiment of FIGS. 8A-8D. In some circumstances it may be desirable to: connect a first panel (e.g. panel 118A) and its edge panel connector component 128A to standoff connector component 122 by forcing panel 118A against standoff 114A in direction 22; and then to subsequently connect a second panel (e.g. panel 118B) and its edge panel connector component 128B to the same standoff retainer component 122 by forcing panel 118B against standoff 114A in direction 22. Connection of each panel 118A, 118B (and its connector component 128A, 128B) to standoff connector component 122 may be similar to that described above for simultaneous connection of a pair of edge-adjacent panels, except that the deformation of arms 122A, 122B may be less for the first panel than for simultaneous panels and possibly greater for the second panel than for simultaneous panels.

Formwork 110 may optionally comprise cap connectors 120. Cap connectors 120 may be connected to a pair of edge-adjacent panels 118 that are coupled to an edge-connecting standoff 114A as described above. The connection of cap connectors 120 to a pair of edge-adjacent panels 118 may provide the exterior surface of formwork 110 with a finished (e.g. uniform) appearance and may be useful to reinforce the coupling of edge-adjacent panels 118 to edge-connecting standoff 114A (e.g. to prevent unzipping). In embodiments comprising cap connectors 120, panels 118 comprise optional outer panel connector components 126—outer panel connector component 126A at one edge of panel 118 and outer panel connector component 126B at the opposite edge of panel 118. Cap connectors 120 comprise cap connector components 132 which are complementary to outer panel connector components 126.

Cap connectors 120 may be coupled to a pair of edge-adjacent panels 118 by forcing cap connectors 120 in directions 22 generally normal to surface 14 of existing structure 10 and generally orthogonal to the plane of panels 118 (or to the tangential plane of panels 118 at the locations of outer panel connector components 126), such that hooked arms 132A, 132B of cap connector components 132 engage corresponding outer panel connector components 126A, 126B. This coupling may involve initially deforming outer panel connector components 126 and/or cap connector components 132 and, subsequently, permitting restorative deformation forces to at least partially restore the shape of the deformed connector components 126, 132 to thereby lock outer panel connector components 126 to cap connector components 132 and couple cap connectors 120 to edge-adjacent panels 118. To facilitate such deformation, outer panel connector components 126 and cap connector components 132 may comprise beveled surfaces (not explicitly enumerated), which may be similar to beveled surfaces 134A, 134B, 142A, 142B, 136A, 136B of panel connector components 130, 128 and standoff connector components 122 and/or concavities (not explicitly enumerated) which may be similar to concavities 140, 144, 138 of panel connector components 130, 128 and standoff connector components 122.

FIG. 5D shows a standoff retainer 116 according to a particular embodiment. Standoff retainer 116 comprises an elongated bent strip which is coupled to existing structure 10 and to standoffs 114 to mount standoffs 114 to existing structure 10. Standoff retainer 116 comprises one or more standoff-engaging features 148. In the illustrated embodiment, standoff retainer 116 is bent or otherwise fabricated such that standoff-engaging features 148 comprise standoff-engaging bends 148. In other embodiments, standoff-engaging features 148 may be provided by other constructions.

In operation, standoff retainers 116 extend transversely through apertures 150 in standoffs 114 such that standoffs 114 are located in the general vicinity of standoff-engaging bends 148. In the illustrated embodiment, one standoff 114 is provided for each standoff-engaging bend 148. This is not necessary. In general, the ratio of standoff-engaging bends 148 to standoffs 114 may be greater than unity. In the illustrated embodiment, one standoff retainer 116 extends through every second aperture 150 of standoffs 114. This is not necessary. In some embodiments, standoff retainers 116 may extend through every aperture 150 of standoffs 114. In other embodiments, standoff retainers 116 may extend through further spaced apart (i.e. fewer) apertures 150 in each standoff 114. In other embodiments, standoff retainers 116 may engage standoffs 114 without extending through apertures 150.

Once standoff retainers 116 are extended through apertures 150 (or otherwise engage standoffs 114), standoff retainers 116 are placed against surface 14 of existing structure 10 such that flat portions 152 of standoff retainers 116 may abut against surface 14 of existing structure 10. Standoff retainers 116 (and standoffs 114 to which they are engaged) are then mounted to existing structure 10 at desired locations. In particular embodiments, suitable fasteners 154 project through flat portions 152 of standoff retainers 116 and into existing structure 10. In some embodiments, standoff retainers 116 may comprise apertures 156 through which fasteners 154 may project to mount standoff retainers 116 to existing structure 10. In other embodiments, fasteners 154 may project through flat portions 152 of standoff retainers 116 or flat portions 152 of standoff retainers 116 may be drilled to accept fasteners 154. As will be appreciated by those skilled in the art, the nature of fasteners 154 used to mount standoff retainers 116 to existing structure 10 may depend on the nature of existing structure 10. In other embodiments, other techniques and/or mechanisms maybe used to couple standoff retainers 116 to existing structure 10.

Once standoff retainers 116 and standoffs 114 are mounted to existing structure 10 at desired locations, panels 118 may be coupled to standoffs 114 and cap connectors 120 may optionally be connected to panels 118 as described above.

Standoff retainers 116 of the illustrated embodiment represent one particular type of standoff retainer. In other embodiments, other suitable standoff retainers may be used to mount standoffs 114 to existing structure 10. Other suitable standoff retainers which may be used in connection with the various formwork components described herein are described in Patent Cooperation Treaty application No. PCT/CA2010/000003 and U.S. patent application Ser. No. 12/794,607 which are incorporated herein by reference.

In the illustrated embodiment, where formwork 110 is used to create a repair structure 112 to repair existing structure 10, standoffs 114, panels 118 and optional cap connectors 120 extend substantially the same length as the distance between constraining portions 18A, 18B of existing structure 10. In such an example application, after the assembly of formwork 110 (including coupling of standoff retainers 116 to standoffs 114 and to existing structure 10 to mount standoffs 114, coupling panels 118 to standoffs 114 and optionally coupling cap connectors 120 to panels 118), concrete can be introduced into the space 158 between panels 118 and surface 14 of existing structure 10. Concrete may be pumped into space 158 using a concrete introduction port (not shown). Concrete introduction ports and their use to introduce concrete into a formwork are well known in the art. In embodiments, where formwork 110 does not occupy the entire space between constraints 18A, 18B or where the top of formwork 110 is accessible, concrete may be introduced into space 158 behind formwork 110 via an edge (e.g. a top edge) of formwork 110 without a need for a concrete introduction port.

Liquid concrete introduced into space 158 will flow through apertures 150 in standoffs 114 to encase standoffs 114. Liquid concrete will be retained in space 158 by panels 118 (which are secured to existing structure 10 by standoffs 114 and standoff retainers 116), and portions 12, 18A, 18B of existing structure 10. Liquid concrete will also fill damaged regions 16A-16C of existing structure 10. When concrete in space 158 cures, portions of standoffs 114 and standoff retainers 116 will be encased in the solidified concrete and will tend to bond the new concrete layer of the repair structure (i.e. concrete in space 158) to existing structure 10. Formwork apparatus 110 acts as a stay-in-place formwork which remains attached to existing structure 10 once the concrete in space 158 solidifies. Accordingly, rather than bare concrete being exposed to the environment, panels 118 clad the exterior of structure 10 such that panels 118 are exposed to the environment. This may be advantageous for a number of reasons. By way of non-limiting example, panels 118 may be more resistant to the environment or substances that contributed to the original degradation of existing structure 10 (e.g. salt water, salts or other chemicals used to de-ice roads or the like). Panels 118 may be more hygienic (e.g. when storing food) or more attractive than bare concrete. Encasing portions of formwork apparatus 110 (e.g. standoffs 114 and standoff retainers 116) in concrete within space 158 may provide additional structural integrity to existing structure 10.

In other embodiments, constraining portions 18A, 18B of existing structure 10 may not be present or may not be located in same places relative to portion 12 so as to retain the concrete in space 158 between panels 118 and surface 14 of existing structure 10. In such cases, it may be necessary or desirable to provide edge formwork components (not explicitly shown) which may be used to retain concrete in space 158 at the edges of panels 118. In particular, it may be necessary or desirable to provide edge formwork components at the bottom and/or the transverse edges of a formwork assembled using standoffs 114, standoff retainers 116, panels 118 and optionally cap connectors 120. Suitable examples of edge formwork components which may be used in connection with the other formwork components described herein are described in Patent Cooperation Treaty application No. PCT/CA2010/000003 and US patent application Ser. No. 12/794,607 which are incorporated herein by reference.

In some applications, it may be desirable to provide repair structure 10 with extra strength using reinforcement bar (commonly referred to as rebar). Prior to coupling panels 118 to standoffs 114, rebar may be extended transversely through aligned apertures 150 in standoffs 114. Once rebar is extended through apertures 150 in standoffs 114, orthogonal rebar may be extended in directions parallel with the elongated dimensions of panels 118 and standoffs 114. Such orthogonal rebar may be strapped to the tranversely extending rebar which projects through apertures 150 of standoffs 114. When concrete is introduced to space 158, the rebar will be encased in concrete and will strengthen the corresponding repair structure 112.

Figure 9:
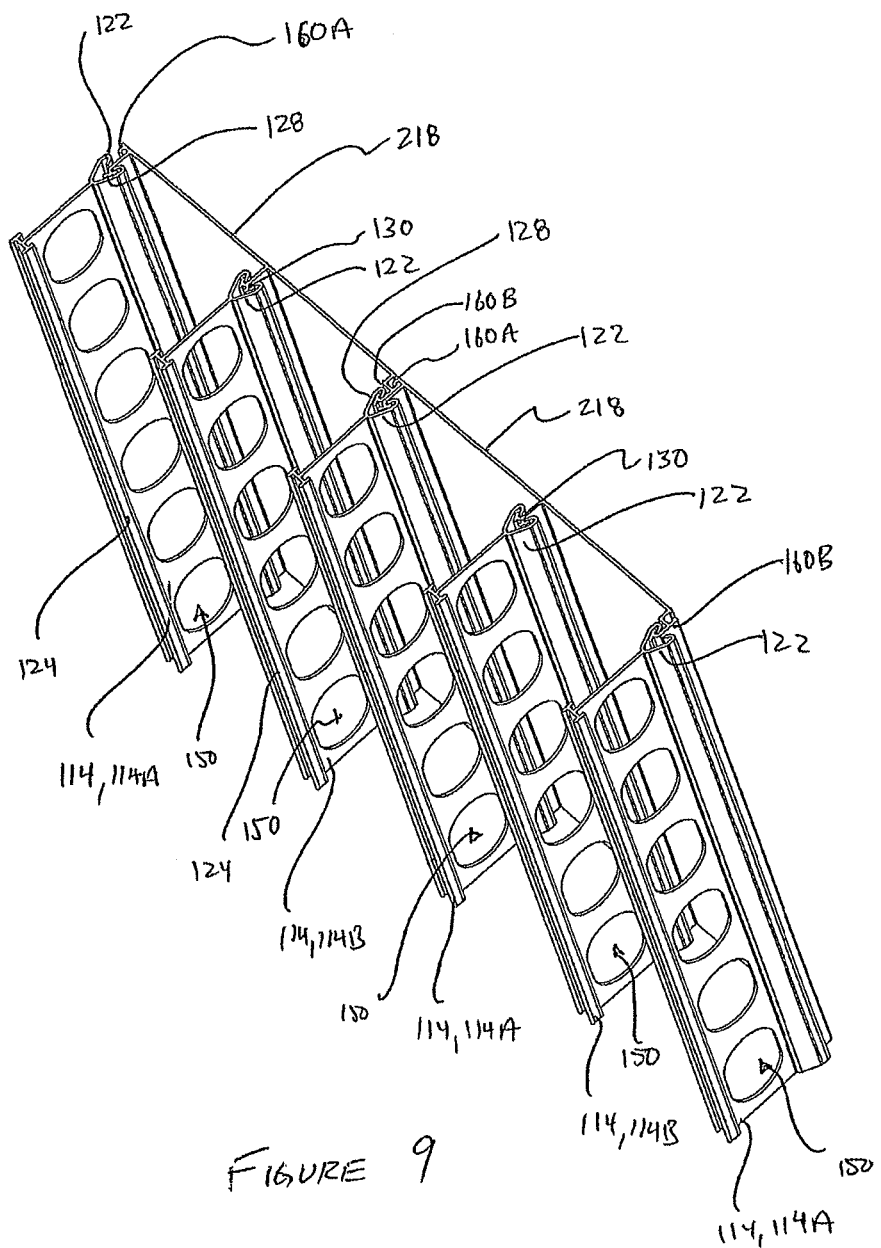
FIG. 9 is a partial isometric view of a formwork apparatus for repairing the FIG. 1 existing structure according to another embodiment.

As discussed above, the use of cap connectors 120 is optional. FIG. 9 is a partial isometric view of a formwork apparatus 210 which may be used to form a repair structure (e.g. for repairing existing structure 10) according to another embodiment. The existing structure is omitted from FIG. 9 for clarity. In many respects, formwork apparatus 210 is similar to formwork apparatus 110 and similar reference numerals are used to refer to similar features. Formwork 210 differs from formwork 110 principally in that rather than using cap connectors, edge adjacent panels 218 of formwork 210 are coupled directly to one another and then coupled to standoff connector components 122 of edge-connecting standoffs 114A. To facilitate direct edge-to-edge connection, panels 218 of formwork 210 comprise edge connector components 160A on a first transverse edge thereof and edge connector components 160B on the opposing transverse edge thereof.

Figures 10A, 10B:
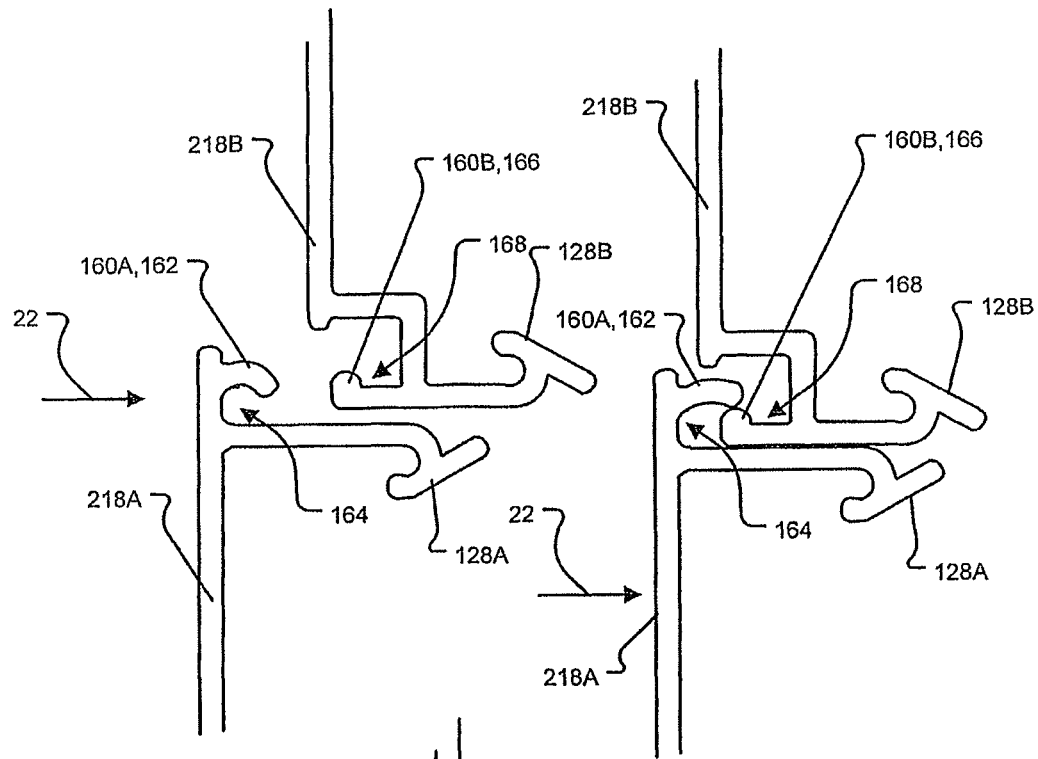
FIGS. 10A, 10B and 10C (collectively, FIG. 10) show magnified cross-sectional views of the process of coupling a pair of edge-adjacent panels of the FIG. 9 formwork to one another.
Figure 10C:
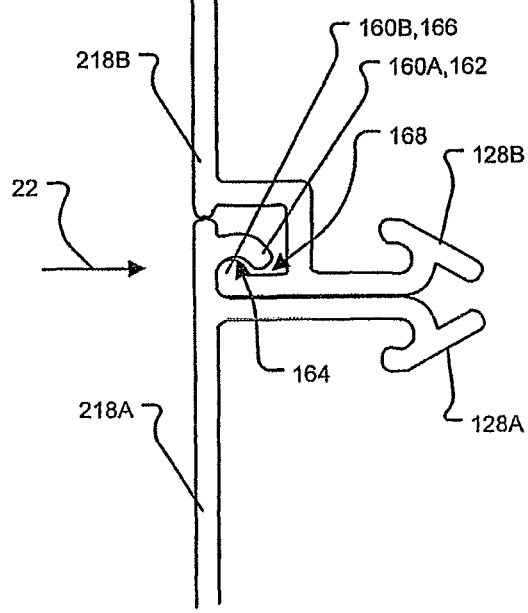

Edge connector component 160A of a first panel 218 is coupleable to edge connector component 160B of a second panel 218B by forcing panel 218A in direction 22 as shown in detail in FIGS. 10A-10C. Direction 22 is similar to direction 22 discussed above for formwork 110—i.e. normal to the surface 14 of existing structure 10 and to the plane of panels 218 (or the tangential plane of panels 218 at the location of connector components 160A, 160B). As shown in FIG. 10A, coupling of a pair of edge adjacent panels 218A, 218 starts with aligning the panels 218A, 218B in edge-adjacent relationship, so that edge connector components 160A, 160B of panels 218A, 218B are aligned with one another (FIG. 10A).

As edge connector component 160A is forced into engagement with edge connector component 160B (i.e. in direction 22), a hooked arm 162 of edge connector 160A abuts against a hooked arm 166 of edge connector component 160B. This abutment of hooked arms 162, 166 causes deformation of one or both of hooked arms 162, 166 as shown in FIG. 10B. More particularly, hooked arm 162 may be deformed in direction 170 and/or hooked arm 166 may be deformed in direction 172 (FIG. 10B). As panel 218A continues to be forced in direction 22 relative to panel 218B, hooked arm 162 will pass beyond hooked arm 166 and vice versa, in which case restorative deformation forces will tend to at least partially restore the shape of hooked arms 162, 166, such that hooked arm 162 will extend into an terminate in concavity 168 of edge connector component 160B and hooked arm 166 will extend into and terminate in concavity 164 of edge connector component 160A (FIG. 10C).

As shown in FIGS. 10A-10C, the edges of edge-adjacent panels 218A, 218B comprise panel connector components 128A, 128B which are substantially similar to panel connector components 128A, 128B of panels 118 described above and are coupleable to standoff connector components 122 of edge-connecting standoffs 114A in a manner that is substantially similar to that of panels 118 described above.

In other respects, formwork 210 is similar to formwork 110.

In some embodiments, formwork comprises sealing members configured to provide substantially liquid tight seals between edge-adjacent panels. Such sealing members may, for example, provide substantially liquid tight seals between connected outer panel connector components, connector caps and/or edge connector components. FIG. 11 shows a magnified, partial cross-sectional view of formwork 310 according to an example embodiment which comprises sealing members 370. Formwork 310 is generally similar to formwork 110. Sealing members 370 provide a substantially liquid tight seal between edge adjacent panels 318A and 318B. In particular, sealing members 370 provide a substantially liquid tight seal between cap connector 320 and outer panel connector components 326. Sealing members may comprise materials suitable for liquid-tight sealing, such as elastomers and the like.

In the illustrated embodiment, sealing members 370 extend longitudinally along the outer surfaces of transversely opposite corners of connector cap 330 (i.e., at the base of connector components 332 of connector cap 330). Sealing members 370 may be formed integrally with connector cap 330. For example, sealing members 370 and connector cap 320 may be coextruded through a single extruder (e.g., to form sealing members 370 and connector cap 320 from the same material) or coextruded through two or more different extruders (e.g., to form sealing members 370 and connector cap 320 from different materials). In other embodiments, sealing members 370 are sealingly coupled to connector cap 330 using other suitable means (e.g., adhesives, heat bonding, and/or the like). In other embodiments, outer panel connector components 326 may comprise sealing members 370 (e.g., instead of, or in addition to, connector cap 320 comprising sealing members 370). In some embodiments, sealing members 370 are applied to seal the connection between connector cap 320 and outer panel connector components 326 after cap 320 is connected to one or both of outer panel connector components 326A and 326B.

Sealing members 370 of the illustrated embodiment are configured to sealingly abut the outer panel connector components 326 when cap 320 is connected to edge-adjacent panels 318. More particularly, when cap connector 320 is coupled to edge-adjacent panels 318 (such as in a manner described above, for example), sealing member 370A is configured to be forced into sealing abutment with outer panel connector component 326A and sealing member 370B is configured to be forced into sealing abutment with outer panel connector component 326B. In some embodiments, sealing members 370 are resiliently deformable and configured to be deformed against outer panel connector components 326 when cap 320 is coupled to edge-adjacent panels 318. In such embodiments, the restorative deformation forces of sealing members 370 may increase the contact force between sealing members 370 and outer panel connector components 326 to provide a tighter seal therebetween.

FIG. 12 shows a magnified, partial cross-sectional view of another example embodiment wherein formwork 410 comprises sealing member 470. Formwork 410 is generally similar to formwork 210. Sealing member 470 provides a substantially liquid tight seal between edge adjacent panels 418A and 418B. In particular, sealing member 470 provides a substantially liquid tight seal between edge connector components 460A and 460B. In the illustrated embodiment, sealing member 470 extends longitudinally along edge connector component 460A. More particularly, sealing member 470 is located along the transversely outward face of hooked arm 462. Sealing member 470 may be formed integrally with edge connector component 460A (e.g., by coextrusion) or be sealingly coupled to edge connector component 460A by other suitable means. In other embodiments, edge connector component 460B comprises sealing member 470 (e.g., instead of, or in addition to, edge connector component 460A comprising sealing member 470). In some embodiments, sealing member 470 is applied to seal the connection between edge connector components 460A and 460B after edge connector components 460A and 460B have been connected together.

Sealing member 470 is configured to sealingly abut edge connector component 460B when edge-adjacent panels 418 are connected together. More particularly, when edge connector component 460A is coupled to edge connector component 460B (such as in a manner described above, for example), sealing member 470 is configured to be forced into sealing abutment with edge connector component 460B, such that sealing member 470 and hooked arm 462 seal cavity 468. In some embodiments, sealing member 470 is resiliently deformable and configured to be deformed against edge connector component 460B when edge-adjacent panels 418 are coupled together. In such embodiments, the restorative deformation forces of sealing member 470 may increase the contact force between sealing member 470 and edge connector component 460B to provide a tighter seal therebetween.

Figure 13A:
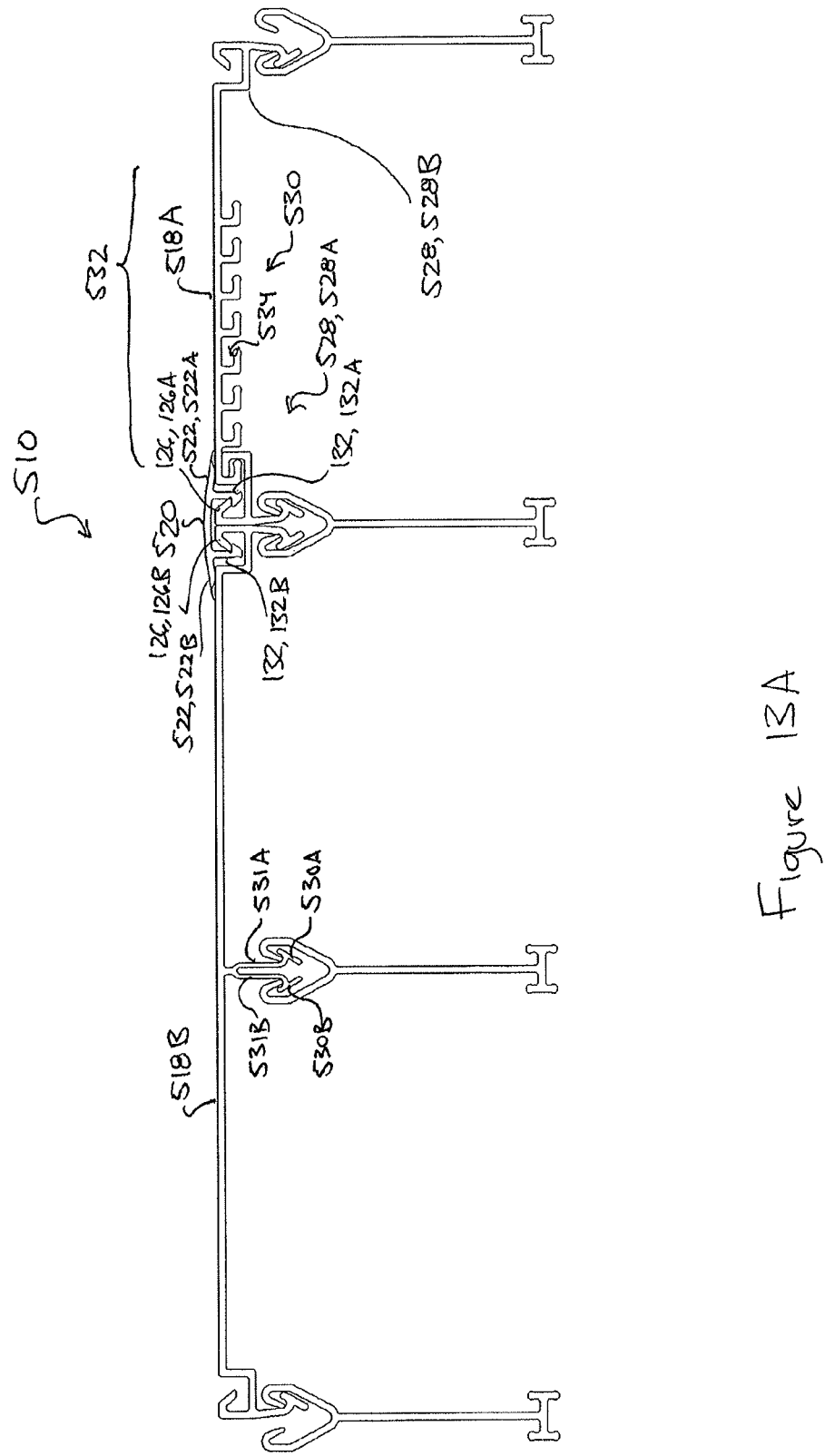
FIGS. 13A and 13B show magnified, partial cross-sectional views of a formwork apparatus according to a particular embodiment.
Figure 13B:
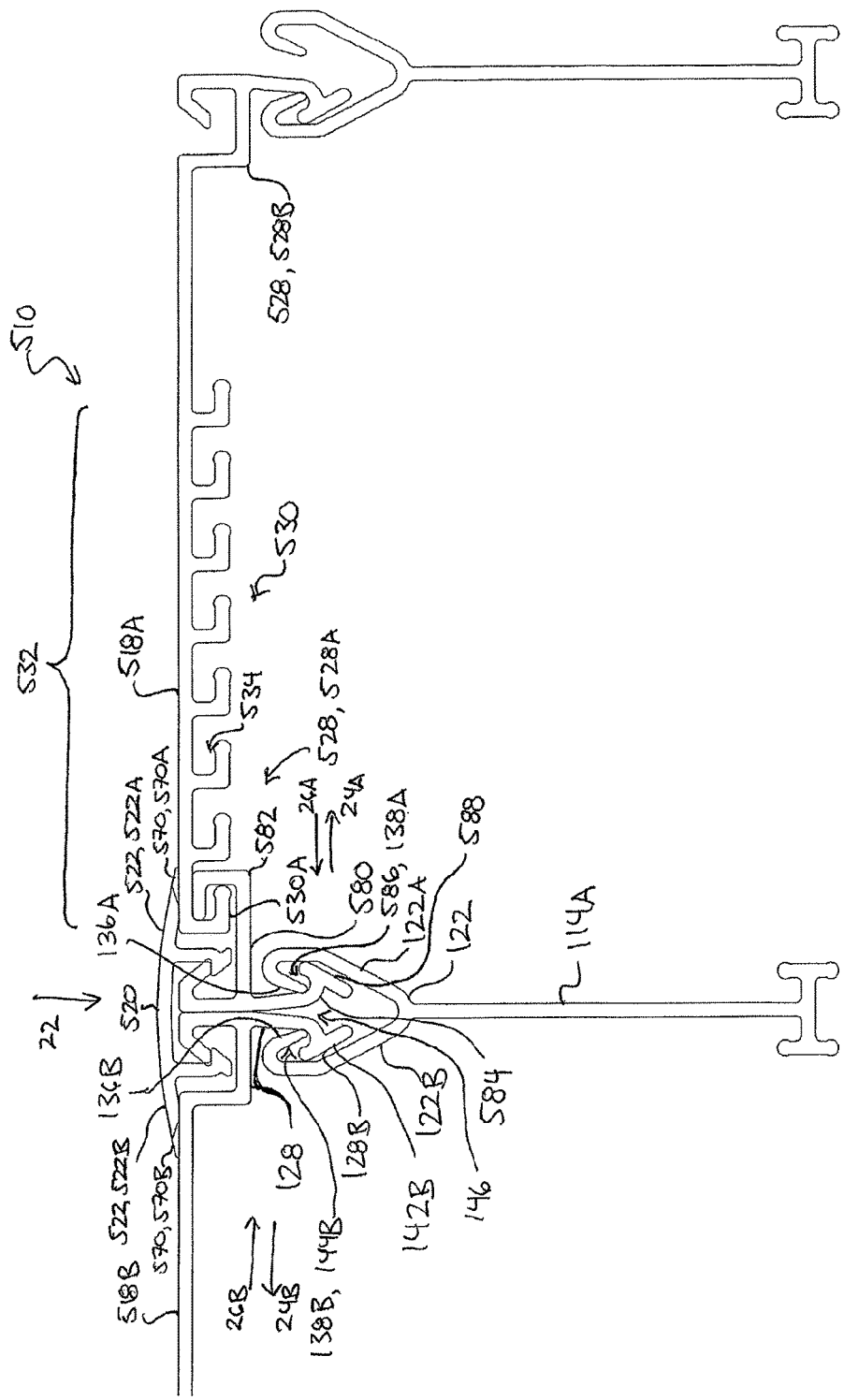

Some embodiments provide panels configured to be selectively sized to one of a plurality of different transverse widths. FIGS. 13A and 13B show magnified, partial cross-sectional views of formwork 510 which may be used to form a repair structure (e.g. for repairing existing structure 10) according to an example embodiment which comprises a selectively sizeable panel 518A. The existing structure is omitted from FIGS. 13A, 13B for clarity. Formwork 510 may be used to Apart from the differences described below, formwork 510 is generally similar to formwork 110, and like reference numbers have been used to designate like components. Panel 518A comprises edge connector components 528—edge connector component 528A at one edge of panel 518A and edge connector component 528B at the opposite edge of panel 518A.

Edge connector component 528B is generally similar to connector component 128B of panel 118. Edge connector component 528A comprises a plurality of hooked arms 530. Hooked arms 530 are arrayed transversely across an end portion 532 of panel 518A. Each hooked arm 530 extends longitudinally along the inward face of panel 518A, and defines a transversely inwardly opening cavity 534. Panel 518A may be selectively sized to one of a plurality of different transverse widths by severing one or more endmost hooked arms 530 from edge connector component 528A. In some embodiments edge connector component 528A is configured to be cut between adjacent hooked arms 530 (e.g., using a sharp edged tool, heat, a combination thereof, or the like) to facilitate severance of hooked arms 530 from edge connector component 528A. For example, edge connector component 528A may comprise portions of reduced thickness (e.g., longitudinal grooves) between adjacent hooked arms 530, along which a cut may more easily be made.

In FIGS. 13A and 13B, panel 518A is coupled to an edge-adjacent panel 518B via an edge-connecting standoff 114A. Panel 518B is substantially similar to panels 118, and like reference numerals are used to refer to like features thereof. Panel 518B differs from panels 118 in that whereas hooked arms 130A, 130B of interior connector components 130 of panel 118 extend from a single stem (e.g., such that arms 130A, 130B and the stem form a "Y" configuration), interior connector component 530 of panel 518B comprises hooked arms 530A, 530B that extend, respectively, from conjoined stems 531A, 531B (e.g., such that arms 530A, 530B and stems 531A, 531B form a a "V" configuration).

In formwork 510 of FIGS. 13A and 13B, a connector component 580 is used to help make the coupling between edge-adjacent panels 518A, 518B and edge-connecting standoff 114A. More particularly:

endmost hooked arm 530A of edge connector component 528A engages a complementary hooked arm 582 of a connector component 580;

hooked arm 122A of a standoff connector component 122 of an edge-connecting standoff 114A engages a complementary hooked arm 584 of connector component 580 such that arm 122A of standoff connector component 122 extends into and terminates in a concavity 586 of connector component 580 and arm 584 of connector component 580 extends into and terminates in concavity 138A of standoff connector component 122; and hooked arm 122B of standoff connector component 122 of edge-connecting standoff 114A engages a complementary hooked arm 128B of an edge panel connector component 128 on panel 518B such that arm 122B of standoff connector component 122 extends into and terminates in concavity 144B of panel connector component 128 and arm 128B of panel connector component 128 extends into and terminates in concavity 138B of standoff connector component 122.

This engagement of hooked arms 530A, 582, hooked arms 122A, 584 and hooked arms 122B, 128B couples (or at least partially couples) the pair of panels 518A, 518B in an edge-adjacent relationship.

The process of coupling connector component 580 to standoff connector component 122 of edge-connecting standoff 114A involves aligning panels 518A, 518B in edge-adjacent relationship and forcing connector component 580 against edge-connecting standoff 114A in direction 22 in a manner similar to that shown in FIGS. 8A-8D. In the illustrated embodiment, hooked arm 584 of connector component 580 comprises a beveled surface 588 which is similar to beveled surfaces 142A of connector components 128A (see FIG. 8A). More particularly, when connector component 580 is placed in edge-adjacent relationship with panel 518B, beveled surfaces 588 and 142B are angled toward one another as they extend in inward direction 22 and beveled surfaces 588 and 142B interact with corresponding beveled surfaces 136A, 136B of standoff connector component 122.

In the illustrated embodiment, coupling panels 518A, 518B to standoff connector component 122 involves placing connector component 580 in edge-adjacent relationship with panel 518B such that the proximate edges of connector component 580 and panel 518B (and hooked arm 584 of connector component 580 and hooked arm 128B of connector component 128) are aligned with space 146 between hooked arms 122A, 122B of standoff connector component 122. As connector component 580 and panel 118B are forced in direction 22 into space 146 and against standoff connector component 122, beveled surfaces 588 and 142B abut against beveled surfaces 136A, 136B, causing a deformation of hooked arms 122A, 122B as beveled surfaces 588, 142B, 136A, 136B slide against one another and connector components 580 and 128 extend into space 146. More particularly, hooked arm 122A of connector component 122 deforms in a direction 24A away from space 146 and hooked arm 122B of connector component deforms in a direction 24B away from space 146. Directions 24A, 24B may be comprise components which are aligned with the plane of panel 518B.

As connector component 580 and panel 518B continue to be forced in direction 22, arms 122A, 122B deform in directions 24A, 24B past the edges of arms 584 and 128B (i.e. beveled surfaces 136A, 136B move past the edges of beveled surfaces 588, 142B) and restorative deformation forces (e.g. elastic forces) cause arms 122A, 122B to move back in directions 26A, 26B such that arms 122A, 122B extend into concavities 586 and 144B of connector component 580 and panel connector component 128 and arms 584 and 128B extend into concavities 138A, 138B of connector components 122. Since connector component 580 and panel connector component 128B are forced and extend into space 146 between arms 122A, 122B of standoff connector component 122, connector component 580 and panel connector component 128B may be considered to be "male" connector components corresponding to the "female" standoff connector component 122. In other embodiments, standoff connector components 122 may comprise male connector components and connector component 580 and panel connector component 128B may comprise female connector components.

It is not necessary that connector component 580 and panel 518B be simultaneously coupled to a standoff 114A. In some circumstances it may be desirable to: connect a connector component (e.g. connector component 580) and its hooked arm 584 to standoff connector component (e.g., standoff connector component 122) by forcing the connector component against the standoff (e.g., standoff 114A); and then to subsequently connect a panel (e.g. panel 518B) and its edge panel connector component (e.g., edge panel connector component 128B) to the same standoff connector component by forcing the panel against the standoff. Sequential connection of connector component 580 and panel 518B to standoff connector component 122 may be similar to that described above for simultaneous connection of connector component 580 and panel 518B, except that the deformation of arms 122A, 122B may be less for the first connected of connector component 580 and panel 518B than for simultaneous connection and possibly greater for the later connected of connector component 580 and panel 518B than for simultaneous connection.

Panel 518A may be coupled to connector component 580 before or after connector component 580 is coupled to standoff 114A. For example, in the illustrated embodiment, complementary hooked arms 530A and 582 may be made to engage one another before or after connector component 580 is coupled to standoff 114A by rotation and translation of connector component 580 and panel 518A relative to one another in the transverse plane (i.e., about an axis into the page of FIGS. 13A and 13B). In some embodiments, connector component 580 and hooked arms 530 are configured so that after connector component 580 is coupled to standoff 114A, panel 518A cannot be coupled to (or uncoupled from) connector component 580 by only relative transverse movement between panel 518A and connector component 580.

Formwork 510 may optionally comprise cap connectors 520. The connection of cap connector 520 to connector component 580 and panel 518B is generally similar to the connection of cap connectors 120 to edge-adjacent panels 118 described above. In embodiments comprising cap connectors 520, connector components 580 comprise optional outer panel connector components 126, which are complementary to connector components 132 of cap connectors 520.

Cap connectors 520 differ from cap connectors 120 in that cap connectors 520 are configured to abut the outward faces of the edge-adjacent panels to which they are connected. In the illustrated embodiment, cap connector 520 comprises outward flanges 522, which extend laterally outward of connector components 132. Flanges 522 are configured to abut the outward faces of edge-adjacent panels to which cap connectors 520 are coupled. As shown in FIGS. 13A and 13B, flange 522A abuts panel 518A and flange 522B abuts panel 518B.

In some embodiments, cap connectors 520 are configured to form seals against the outward faces of the edge-adjacent panels to which they are connected. In the illustrated embodiment, flanges 522 comprise sealing members 570. Sealing members 570 provide a substantially liquid tight seal between flanges 522 and the outward faces of edge adjacent panels 518. More particularly, sealing members 570 are located longitudinally on outward ends of flanges 522 and are configured to sealingly abut the outer faces of panels 518 when cap 520 is connected thereto. More particularly, when cap connector 520 is coupled to edge-adjacent panels 518, sealing member 570A is configured to be forced into sealing abutment with the outer face of panel 518A and sealing member 570B is configured to be forced into sealing abutment with the outer face of panel 518B.

In some embodiments, sealing members 570 are resiliently deformable and configured to be deformed against panels 518 when cap 520 is coupled to edge-adjacent panels 518. In such embodiments, the restorative deformation forces of sealing members 570 may increase the contact force between sealing members 570 and outer panel connector components 126 to provide a tighter seal therebetween. In some embodiments, flanges 522 are resiliently deformable and configured to be deformed against panels 518 when cap 520 is coupled to edge-adjacent panels 518, in order that the restorative deformation forces of flanges 522 may increase the contact force between sealing members 570 and outer panel connector components 126 to provide a tighter seal therebetween.

Sealing members 570 may be formed integrally with connector cap 520 (e.g. by coextrusion) or sealingly coupled to connector cap 520 using other suitable means. In other embodiments, the outer surfaces of panels 518 may comprise sealing members 570 (e.g., instead of, or in addition to, connector cap 520 comprising sealing members 570). In some embodiments, sealing members 570 are applied to seal the connection between connector cap 520 and panels 518 after cap 520 is connected to one or both of outer panel connector components 126A and 126B.

Figure 14A:
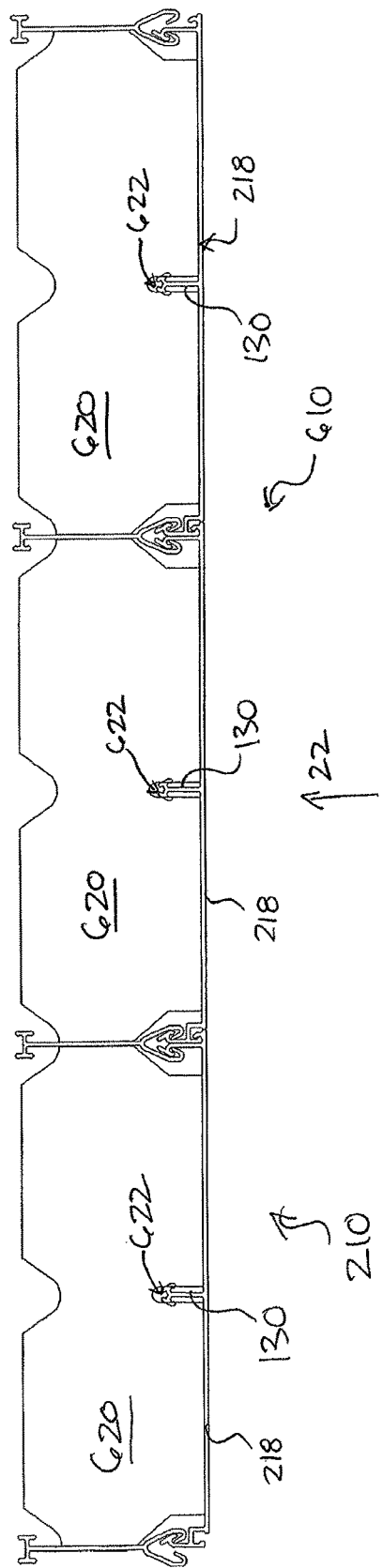
Figure 14B:
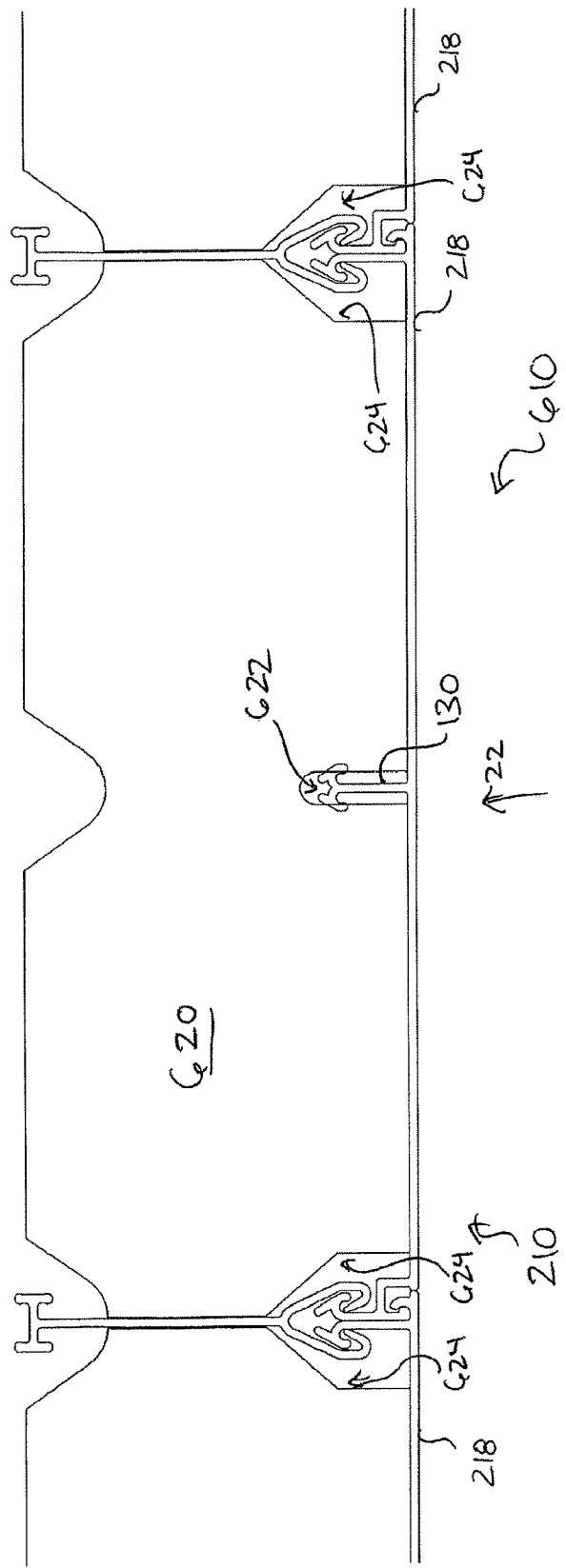

In some embodiments, systems may be provided to insulate and/or clad existing structures (e.g. existing structure 10). FIGS. 14A, 14B and 14C show magnified, partial cross-sectional views of insulation and cladding system 610 which may be used insulate or clad an existing structure and/or to form a repair structure (e.g. for repairing existing structure 10) according to an example embodiment. System 610 comprises a cladding architecture that is substantially similar to formwork 210 described above, except for the absence of interior standoffs 114B. For the sake of brevity, the description of formwork 210 is not repeated here. System 610 also comprises a plurality of insulating members 620 (e.g. pre-formed insulation members 620). Insulating members 620 may comprise insulation appropriate for thermal, fire, acoustic and/or impact insulation, for example. Non-limiting examples of materials that insulating members 620 may comprise include polystyrene foams (extruded or expanded), urethane foam, cementitious insulation, rockwool insulation, fiberglass batt and/or the like. In some embodiments, insulating members 620 comprise rigid board insulation, but this is not necessary and pliable forms of insulation (e.g. fiberglass batt, blow in ("popcorn") insulation and/or the like) may be used. Insulating members 620 may be solid, or may comprises voids (e.g., insulating members 620 may comprise corrugated members).

In the illustrated embodiment, interior connector components 130 of panels 218 and insulating members 620 are configured to be fastened to one another. Insulating members 620 may comprise longitudinal recesses 622 for this purpose. Insulating members 620 and panels 218 may be fastened to one another by aligning recesses 622 with interior connector components 130 of panels 218 and forcing connector components 130 into recesses 622 in directions 22 generally normal to the plane of panels 218. Forcing interior panel connector components 130 into recesses 622 in directions 22 may initially deform connector components 130 and/or insulating members 620 in the vicinity of recesses 622, and, subsequently, permit restorative deformation forces to at least partially restore the shape of the deformed connector components 130 and/or insulating members 620 to thereby fasten connector components 130 in recesses 622 and couple panels 218 to insulating members 620.

In some embodiments, panels 218 may be coupled to insulating members 620 before panels 218 are coupled to edge-connecting standoffs 114A. Where panels 218 are coupled to insulating members before panels 218 are coupled to edge-connecting standoffs 114A, panels 218 and their associated insulating members 620 may be simultaneously coupled to standoffs 114A by coupling panel edge connector components 128 to standoff connector components 122. In some embodiments, insulating members 620 are inserted between edge-connecting standoffs 114A prior to coupling panels 218 to insulating members 620. For example, insulating members 620 maybe wedged between standoffs 114A and the panels 218 may be coupled to edge connecting standoffs 114A and fastened to insulating members 620 at substantially the same time by forcing panels 218 in direction 22.

In some embodiments, insulating members 620 are configured to be spaced apart from standoff connector components 122 when connector components 130 are fastened to insulating members 620 and edge connector components 128 are coupled to standoff connector components 122. In some such embodiments, insulating members 620 are so configured to be sufficiently spaced apart from standoff connector components 122 that insulating members 620 do not interfere with deformation of standoff connector components 122 that may occur during the coupling of panel edge connector components 128 to standoff connector components 122.

In the illustrated embodiment, insulating members 620 comprise notched corners 624. When panels 118 are fastened to insulating members 620, the faces of insulating members 620 that define notched corners 624 are spaced apart from edge connector components 128 of panels 218. As a result, arms 122A and 122B of standoff connector components 122 may be deformed in directions away from one another when panels 218 are forced into engagement with standoffs 114 in directions having components 22 generally normal to the plane of panels 218. Notched corners 624 may be designed to have tolerances as small as reasonably possible to maximize the insulation effect of panels 620. Spacing between insulating members 620 and standoff connector components 122 may be achieved using different corner configurations, such as chamfered corners, filleted corners, or otherwise recessed corners. Spacing may also be achieved without corners by having suitably curved recesses.

In the illustrated embodiment, insulting members 620 have depth substantially equal to the depth of standoffs 114. Insulating members 620 may have depth less than the depth of standoffs 114. Insulating members 620 having a variety of different depths may be coupled to panels 218. Advantageously, this may permit insulating members 620 having depth appropriate for a particular application to be coupled to panels 218 (e.g., thicker insulating members 620 may be coupled to panels 218 in applications where more insulation is required, and relatively thinner insulating members 620 may be coupled to panels 218 in applications where less insulation is required).

Where insulating members 620 have depths less than the depths of standoffs 114, curable and/or blow-in materials may be introduced into the space between the insulating members 620 and the existing structure (not shown in FIGS. 14A, 14B and 14C) to which standoffs 114 are coupled. In some embodiments, insulating members 620 comprise ports (e.g., a concrete introduction port, a blow-in insulation port, etc.) for conveying curable and/or blow-in material (e.g., concrete, blow-in insulation) from outside of insulating members 620 into the space between insulating members 620 and the existing structure. In some such embodiments, insulting members 620 comprise ports that align with corresponding ports defined in panels 218 when insulating members 620 are fastened to panels 218 (e.g., by the engagement of connector components 130 with recesses 622).

The coupling of insulating members 620 to panels 218 is not necessary. In some embodiments, insulation can be contained in the space between panels 218 and the existing structure without being mounted. In some embodiments, insulation may be mounted to the existing structure and then covered by panels 218. In embodiments where insulation is provided by insulating members whose depth is less than that of standoffs 114, the insulating members may be made to abut against the existing structure and concrete or other curable material may be introduced into the space between the insulating members and panels 218.

FIG. 15 is an exploded view of insulation and cladding system 710 which may be used insulate or clad an existing structure and/or to form a repair structure (e.g. for repairing existing structure 10) according to an example embodiment.

System 710 of FIG. 15 is similar to insulation and cladding system 610 (FIGS. 14A, 14B, 14C) includes insulating members 620. System 710 differs from system 610 in that system 710 comprises a cladding architecture 712 that is similar to formwork 510 of FIGS. 13A, 13B. More particularly, cladding architecture 712 of system 710 includes panels 18 similar to panels 518B, caps 520, edge-connecting standoffs 114A and standoff retainers 116 which are substantially similar to the components of formwork 510 described above.

As will be apparent to those skilled in the art in the light of the foregoing disclosure, many alterations and modifications are possible in the practice of this invention without departing from the spirit or scope thereof. For example:

Methods and apparatus described herein are disclosed to involve the use of concrete to repair various structures. It should be understood by those skilled in the art that in other embodiments, other curable materials could be used in addition to or as an alternative to concrete. By way of non-limiting example, apparatus 110 could be used to contain a structural curable material similar to concrete or some other curable material (e.g curable foam insulation, curable protective material or the like), which may be introduced into space 158 between panels 118 and existing structure 10 when the material was in liquid form and then allowed to cure to provide repair structure 112 and to thereby repair existing structure 10.

The longitudinal dimensions 119 of standoffs 114, panels 118 and optional cap connectors 120 may be fabricated to have desired lengths or may be cut to desired lengths. Panels 118 may be fabricated to be have modularly dimensioned transverse width dimensions 121 (e.g. 1, 2, 4, 6, 8, 12 and 16 inches) to fit various existing structures 10 and for use in various applications. Similarly, the inward/outward dimension of standoffs 114 may be sized as desired for particular applications.

In the illustrated embodiment, panels 118 comprise a single interior connector component 130 which is connected to a corresponding single standoff 114. In other embodiments, panels 118 may comprise a different number of interior connector components 130 and may connect to a different number of standoffs 114. For example, in cases where more strength is required, it may be desired to provide panels 118 with a relatively large number of (or more closely spaced) interior connector components 130. In other cases, where the transverse width dimension 121 of panels 118 is greater, it may be desirable to provide panels 118 with a relatively large number fo interior connector components 130. The mere presence of interior connector components 130 does not make it necessary that a standoff 114 be connected to each interior connector component 130. Standoffs 114 may or may not be connected to any particular interior connector component 130 as desired. Where a standoff 114 is not connected to a particular interior connector component 130, the interior connector component 130 may provide an anchor for its panel 118 into the concrete as and when the concrete cures in space 158. In some embodiments, insulation and cladding systems (e.g. insulation and cladding systems 610, 710 described above) which may not include concrete or other curable construction materials may be designed to provide relatively large (e.g. greater than 24 inches) spaces between adjacent standoffs.

In the illustrated embodiment, the exterior surfaces of panels 118 are generally planar. This is not necessary. In some embodiments, panels 118 may have curved exterior surfaces, corrugated exterior surfaces, surfaces that provide inside corners, and surfaces that provide outside corners. In the case where panels are curved, then the directions in which panels (and their panel connector components) are forced into engagement with standoffs (and their standoff connector components) may be orthogonal (or normal) to a plane that is tangential to the curved panel at the location of the panel connector components. Forcing corner panels into standoffs 114 may comprise first forcing one side of the corner into a first standoff 114 and then subsequently coupling a second side of the corner into a second standoff 114. The first coupling may involve deformation of the corner panel until the second side is forced into its corresponding second standoff.

Surface 14 of existing structure 10 is uneven and includes damaged regions 16A-16C where surface 14 is recessed/indented. Suitable spacers, shims or the like may be used to space standoff retainers 116, heads 124 of standoffs 114 and/or fasteners 154 apart from the uneven surface 14 of existing structure 10. Such spacers, shims or the like, which are well known in the art, may be fabricated from any suitable material including metal alloys, suitable plastics, other polymers, wood composite materials or the like.

It will be understood that directional words (e.g. vertical, horizontal and the like) may be used herein for the purposes of description of the illustrated exemplary applications and embodiments. However, the methods and apparatus described herein are not limited to particular directions or orientations and may be used for repairing existing structures having different orientations. As such, the directional words used herein to describe the methods and apparatus of the invention will be understood by those skilled in the art to have a general meaning which is not strictly limited and which may change depending on the particular application.

The apparatus described herein are not limited to repairing existing concrete structures. By way of non-limiting example, apparatus described herein may be used to repair existing structures comprising concrete, brick, masonry material, wood, metal, steel, other structural materials or the like. One particular and non-limiting example of a metal or steel object that may be repaired in accordance various embodiments described herein is a street lamp post, which may degrade because of exposure to salts and/or other chemicals used to melt ice and snow in cold winter climates.

In some applications, corrosion (e.g. corrosion of rebar) is a factor in the degradation of the existing structure. In such applications, apparatus according to various embodiments of the invention may incorporate corrosion control components such as those manufactured and provided by Vector Corrosion Technologies, Inc. of Winnipeg, Manitoba, Canada and described at www.vector-corrosion.com. As a non-limiting example, such corrosion control components may comprise anodic units which may comprise zinc and which may be mounted to (or otherwise connected to) existing rebar in the existing structure and/or to new rebar introduced by the repair, reinforcement, restoration and/or protection apparatus of the invention. Such anodic corrosion control components are marketed by Vector Corrosion Technologies, Inc. under the brand name Galvanode®. Other corrosion control systems, such as impressed current cathodic protection (ICCP) systems, electrochemical chloride extraction systems and/or electrochemical re-alkalization systems could also be used in conjunction with the apparatus of this invention. Additionally or alternatively, anti-corrosion additives may be added to concrete or other curable materials used to fabricate repair structures in accordance with particular embodiments of the invention.

As discussed above, the illustrated embodiment described herein is applied to provide a repair structure 112 for an existing structure 10 having a particular shape. In general, however, the shape of the existing structure 10 described herein is meant to be exemplary in nature and methods and apparatus of various embodiments may be used with existing structures having virtually any shape. In particular applications, apparatus according to various embodiments may be used to repair (e.g. to cover) an entirety of an existing structure and/or any subset of the surfaces or portions of the surfaces of an existing structure. Such surfaces or portions of surfaces may include longitudinally extending surfaces or portions thereof, transversely extending surfaces or portions thereof, side surfaces or portions thereof, upper surfaces or portions thereof, lower surfaces or portions thereof and any corners, curves and/or edges in between such surfaces or surface portions.

It may be desired in some applications to change the dimensions of (e.g. to lengthen a dimension of) an existing structure. By way of non-limiting example, it may be desirable to lengthen a pilaster or column or the like in circumstances where the existing structure has sunk into the ground. Particular embodiments of the invention may be used to achieve such dimension changes by extending the apparatus beyond an edge of the existing structure, such that the repair structure, once formed and bonded to the existing structure effectively changes the dimensions of the existing structure.

Figure 16:
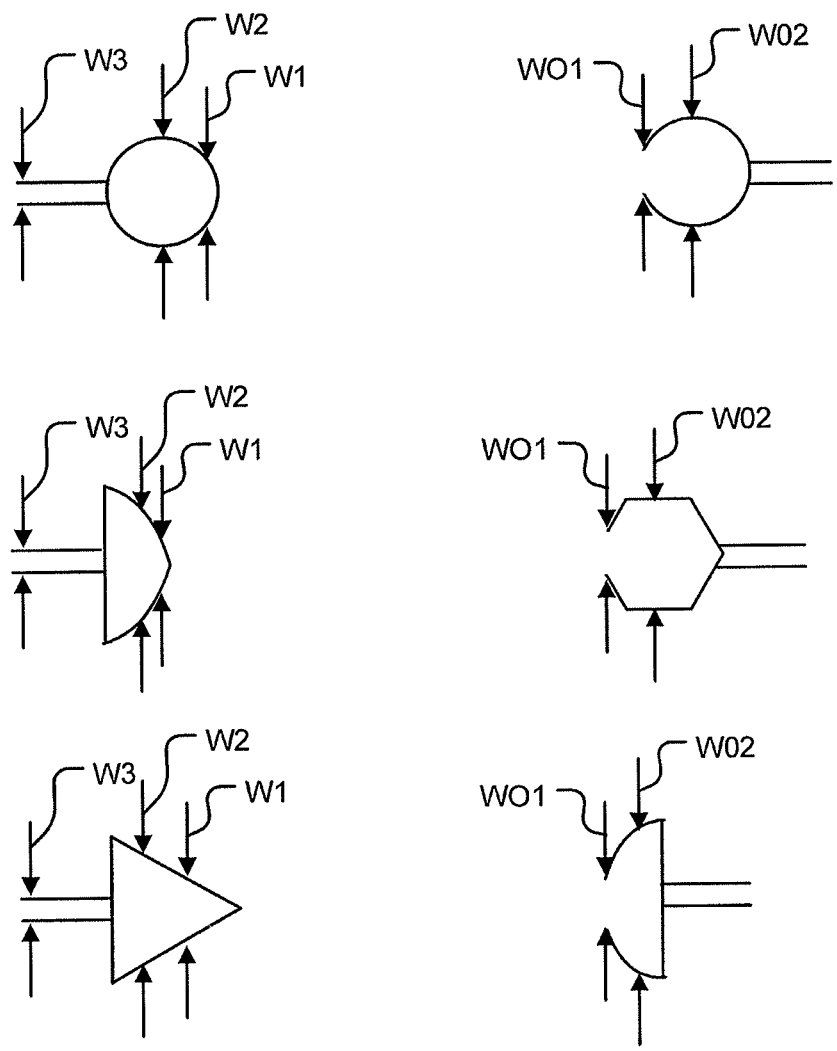
FIG. 16 schematically a number of different types of connector components.

The male and female "push on" connector components 128, 130, 122 of panels 118 and standoffs 114 represent just one form of push on connection which makes use of restorative deformation forces to make a connection. In some embodiments, other forms of male and female connector components could be provided which may use restorative deformation forces to make connections. In some embodiments, male connector components start with a transversely narrow dimension $w_1$ at their edge(s) closest to the female connector components (e.g. their inward edges), then have a transversely wider dimension $w_2$ in their mid-section and then have a transversely narrower dimension $w_3$ in a section that is distal from the female connector component (e.g. an outward section). FIG. 16 illustrates a number of suitable shapes for male connector components. One example of such a male connector component is a ball shape. In some embodiments, female connector component start with a transversely narrow opening $wo_1$ at their edge(s) closest to the male connector components (e.g. at an outward edge), then have a transversely wider opening $wo_2$ at a section relatively more distal from their outward edge(s). FIG. 16 illustrates a number of suitable shapes for female connector components. One example of such female connector components is a C-shaped socket. A wide variety of connector component shapes are possible.

The above-described alterations and modifications are described in connection with formwork 110. Many of these alterations and modifications are also applicable to the other formworks 210, 310, 410, 510 and systems 610, 710 described herein.

What is claimed is:

1. A method for covering at least a portion of a surface of an existing structure with a repair structure fabricated from curable concrete, the method comprising:
coupling a standoff to the existing structure, such that the standoff projects outwardly away from the surface of the existing structure; and
coupling a cladding panel to the standoff by forcing the panel and a panel connector component thereof, in an inward direction toward the surface of the existing structure, into engagement with a standoff connector component of the standoff at a location spaced apart from the surface of the existing structure thereby providing a concrete-retaining engagement between the panel connector component and the standoff connector component wherein coupling the cladding panel to the standoff provides a space between the cladding panel and the surface of the existing structure, the cladding panel shaped such that the space spaces the cladding panel apart from the surface of the existing structure substantially across a full transverse width of the cladding panel;
introducing curable concrete into the space between the panel and the existing structure, the panel and the concrete-retaining engagement between the panel connector component and the standing connector component acting as at least a portion of a formwork for retaining the curable concrete until the curable concrete cures to provide the repair structure cladded, at least in part, by the panel;
wherein forcing the panel into engagement with the connector component of the standoff comprises:
deforming the standoff connector component and the panel connector component; and then, subsequently,
permitting restorative deformation forces of the standoff connector component and the panel connector component to at least partially restore a shape thereof to thereby lock the standoff connector component to the panel connector component and to thereby provide the concrete-retaining engagement therebetween;
wherein permitting restorative deformation forces of the standoff connector component and the panel connector component to at least partially restore a shape thereof comprises permitting respective complementary hooked arms of the standoff connector component and the panel connector component to engage one another, such that the hooked arm of the standoff connector component terminates in a corresponding hooked concavity defined by the panel connector component and the hooked arm of the panel connector component terminates in a corresponding hooked concavity defined by the standoff connector component; and
wherein a distal end of the hooked arm of the standoff connector component extends toward the existing structure and a distal end of the hooked arm of the panel connector component extends toward the panel.

2. The method of claim 1 wherein deforming the standoff connector component and the panel connector component comprises causing a deformation-causing portion of one of the standoff connector component and the panel connector component and a resiliently deformable portion of the other of the standoff connector component and the panel connector component to move against one another, thereby causing the deformation-causing portion to deform the resiliently deformable portion.

3. The method according to claim 2 wherein the deformation-causing portion has:
a first transverse dimension at its inward end,
a second transverse dimension at its outward end,
a third transverse dimension at a mid-section intermediate its inward and outward ends, the third transverse dimension wider than the first and second transverse dimensions,
and wherein the resiliently deformable portion defines a transverse opening narrower than the third transverse dimension when the resiliently deformable portion is in an undeformed configuration,
and wherein causing the deformation-causing portion to move against the resiliently deformable portion comprises causing the deformation-causing portion to pass the transverse opening until the mid-section has reached the transverse opening.

4. The method according to claim 3 wherein causing the deformation-causing portion to pass the transverse opening until the mid-section has reached the transverse opening comprises causing a deflecting surface intermediate the midsection and one of the inward end or the outward end to slide against the resiliently deformable portion.

5. The method according to claim 4 wherein the deflecting surface comprises a surface that is beveled with respect to the inward direction.

6. The method according to claim 4 wherein causing the deformation-causing portion to pass the transverse opening until the mid-section has reached the transverse opening comprises causing a pair of beveled surfaces angled toward one another as they extend from the mid-section toward the one of the inward end and the outward end to slide against opposed surfaces of the resiliently deformable portion, thereby deforming the resiliently deformable portion to widen the transverse opening.

7. The method according to claim 4 wherein the deflecting surface comprises an arcuate surface.

8. The method according to claim 3 wherein moving the panel connector component to an engaged configuration in which the restorative deformation forces of the standoff connector component and the panel connector component at least partially restore a shape thereof comprises causing the mid-section of the deformation-causing portion to move past the transverse opening at least until restorative deformation forces of the resiliently deformable portion at least partially restore a shape thereof, thereby narrowing the transverse opening.

9. The method according to claim 2 wherein the deformation-causing portion defines a transverse opening, and wherein the resiliently deformable portion has:
a first transverse dimension at its inward end,
a second transverse dimension at its outward end,
a third transverse dimension at a mid-section intermediate its inward and outward ends, the third transverse dimension wider than the first and second transverse dimensions when the resiliently deformable portion is in an undeformed configuration;
and wherein causing the deformation-causing portion to move against the resiliently deformable portion comprises causing the resiliently deformable portion to pass the transverse opening until the mid-section has reached the transverse opening.

10. The method of claim 1 comprising installing insulation between the panel and the surface of the existing structure.

11. The method of claim 10 wherein installing insulation between the panel and the surface of the existing structure comprises coupling an insulating member to the panel.

12. The method of claim 11 wherein coupling the insulating member to the panel comprises forcing an interior connector component of the panel into a recess on a surface of the insulating member to thereby fasten the panel to the insulating member and wherein forcing the interior connector component into the recess comprises initially deforming at least one of the interior connector component and the insulating member in the vicinity of the recess, and, subsequently, permitting restorative deformation forces to at least partially restore the shape of the at least one of the interior connector component and the insulating member.

13. The method of claim 11 wherein introducing the curable concrete into the space between the panel and the existing structure comprises introducing the curable concrete into a space between the insulation and the existing structure.

14. The method according to claim 1 wherein one of the standoff connector component and the panel connector component comprises first hooked arms having beveled surfaces angled toward one another as they extend in a first direction generally normal to the surface of the existing structure, and
wherein the other one of the standoff connector component and the panel connector component comprises opposed second hooked arms having respective beveled surfaces angled toward one another as they extend in the first direction, the second hooked arms defining a transverse opening to a space between them, and
wherein deforming the standoff connector component and the panel connector component comprises causing the beveled surfaces of the first hooked arms to slide against the respective corresponding beveled surfaces of the second hooked arms, so that the one of the standoff connector component and the panel connector component passes the transverse opening into the space, thereby deforming the second hooked arms away from the opening.

15. The method according to claim 14 wherein permitting restorative deformation forces of the standoff connector component and the panel connector component to at least partially restore a shape thereof to thereby lock the standoff connector component to the panel connector component comprises causing the beveled surfaces of the first hooked arms to move past the corresponding beveled surfaces of the second hooked arms, thereby permitting restorative deformation forces to at least partially restore a shape of the second hooked arms.

16. The method according to claim 15 wherein the beveled surfaces of the first hooked arms define respective first concavities, and
wherein the beveled surfaces of the second hooked arms of the define respective second concavities, and
wherein when the beveled surfaces of the first hooked arms move past the corresponding beveled surfaces of the second hooked arms, the first hooked arms extend into respective corresponding ones of the second cavities and the second hooked arms extend into respective corresponding ones of the first concavities.

17. The method of claim 1 wherein coupling the cladding panel to the standoff maintains the entirety of the cladding panel at a location spaced apart from the surface of the existing structure.

18. The method of claim 1 wherein a tangential plane of the panel where it engages the standoff connector component is generally parallel to the surface of the existing structure where the standoff projects outwardly from the surface of the existing structure.

19. The method of claim 1 wherein a tangential plane of the panel where it engages the standoff connector component is generally normal to an outward direction in which the standoff projects outwardly from the surface of the existing structure.

20. The method of claim 1 comprising at least one of: introducing curable insulation into the space between the panel and the surface of the existing structure and blowing insulation into the space between the panel and the surface of the existing structure.

21. The method according to claim 1 wherein coupling the cladding panel to the standoff comprises forcing a sealing member into sealing abutment with at least one of the panel and the standoff.

22. The method according to claim 1 comprising coupling a cap to the panel by forcing the cap, in the inward direction, into engagement with an outer panel connector component of the panel.

23. The method according to claim 1 comprising coupling a plurality of cladding panels to the standoff in edge-adjacent relationship by forcing the panels, in the inward direction and into engagement with the standoff connector component of the standoff at the location spaced apart from the surface of the existing structure.

24. The method according to claim 1 comprising:
coupling a plurality of standoffs to the existing structure, such that the standoffs project outwardly away from the surface of the existing structure, and
coupling a cladding panel to each of the standoffs by forcing the panel, in the inward direction and into engagement with respective standoff connector components of the standoffs at locations spaced apart from the surface of the existing structure.

25. The method according to claim 1 wherein coupling the standoff to the existing structure comprises:
coupling a standoff retainer to the standoff; and
mounting the standoff retainer to the surface of the existing structure.

26. A method according to claim 1 wherein:
the hooked concavity of the panel connector component defines a first acute angle; and
the hooked concavity of the standoff connector component defines a second acute angle.

27. A method according to claim 1 wherein the panel connector component is connected to the panel by a single stem.

28. A method according to claim 1 wherein coupling a standoff to the existing structure comprises extending a standoff retainer through an aperture in the standoff and connecting the standoff retainer to the existing structure on both sides of the standoff.

* * * * *